(12) United States Patent
Migos et al.

(10) Patent No.: US 10,275,123 B2
(45) Date of Patent: Apr. 30, 2019

(54) MEDIA PLAYBACK NAVIGATION

(71) Applicant: APPLE INC., Cupertino, CA (US)

(72) Inventors: Charles J. Migos, Milbrae, CA (US); Eugene R. Siew, Mountain View, CA (US); Allison M. Styer, San Francisco, CA (US); Mark Ambachtsheer, Vancouver (CA); Xiang Cao, Mountain View, CA (US); Alastair K. Fettes, San Francisco, CA (US); Yaniv Gur, Los Altos, CA (US); Martin J. Murrett, San Francisco, CA (US); Jacob Refstrup, San Jose, CA (US)

(73) Assignee: Apple Inc., Cupertino, CA (US)

( * ) Notice: Subject to any disclaimer, the term of this patent is extended or adjusted under 35 U.S.C. 154(b) by 506 days.

(21) Appl. No.: 14/871,933

(22) Filed: Sep. 30, 2015

(65) Prior Publication Data

US 2016/0299648 A1    Oct. 13, 2016

Related U.S. Application Data

(60) Provisional application No. 62/146,208, filed on Apr. 10, 2015.

(51) Int. Cl.
*G06F 3/048* (2013.01)
*G06F 3/0483* (2013.01)
*G06F 3/0487* (2013.01)
*G06F 3/0484* (2013.01)
*G11B 27/00* (2006.01)

(52) U.S. Cl.
CPC .......... *G06F 3/0483* (2013.01); *G06F 3/0487* (2013.01); *G06F 3/04847* (2013.01); *G11B 27/00* (2013.01)

(58) Field of Classification Search
CPC ......................... G06F 3/04883; G11B 27/034
See application file for complete search history.

(56) References Cited

U.S. PATENT DOCUMENTS

| | | | |
|---|---|---|---|
| 9,927,957 B1* | 3/2018 | Sagar | G06F 3/165 |
| 2014/0201632 A1* | 7/2014 | Kunigita | H04N 21/4667 715/716 |
| 2015/0051722 A1* | 2/2015 | Singhal | G06F 3/165 700/94 |

* cited by examiner

*Primary Examiner* — Claudia Dragoescu
(74) *Attorney, Agent, or Firm* — Kilpatrick Townsend & Stockton LLP

(57) ABSTRACT

Methods and devices are provided. A method includes at an electronic device with one or more processors, a display, and memory, displaying, by the display, a playback position indicator for a media file; receiving, by the electronic device, a user input for adjusting a position of the playback position indicator from a first position of the media file to a second position of the media file; and in response to receiving the user input, displaying, by the display, a snippet from a document corresponding to content of the media file at the second position of the media file.

14 Claims, 14 Drawing Sheets

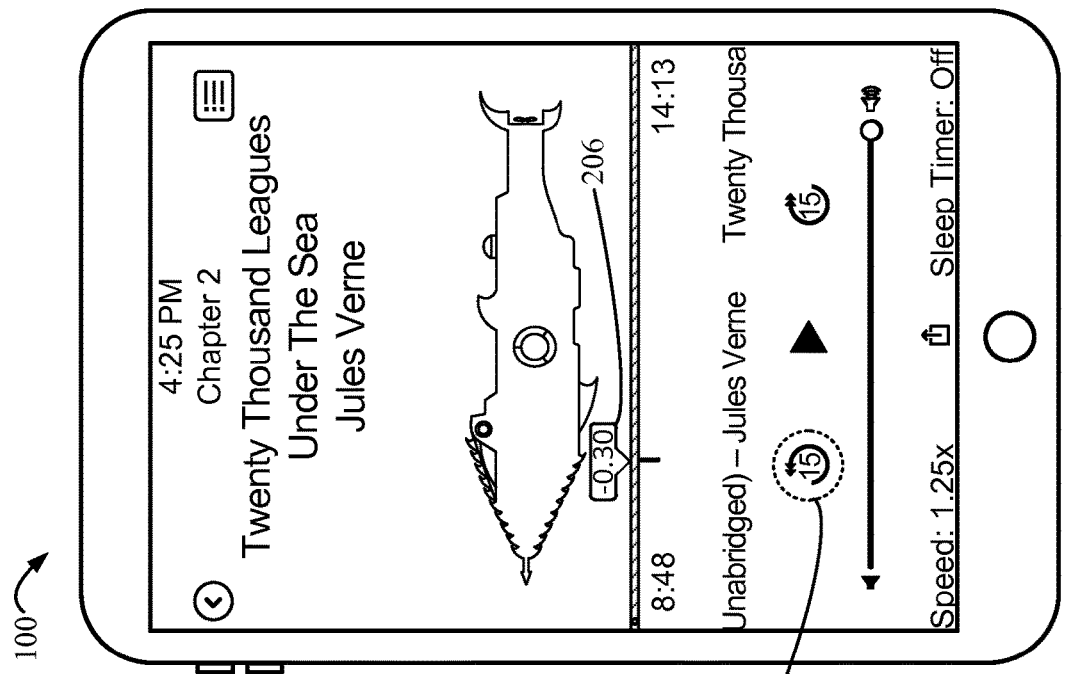
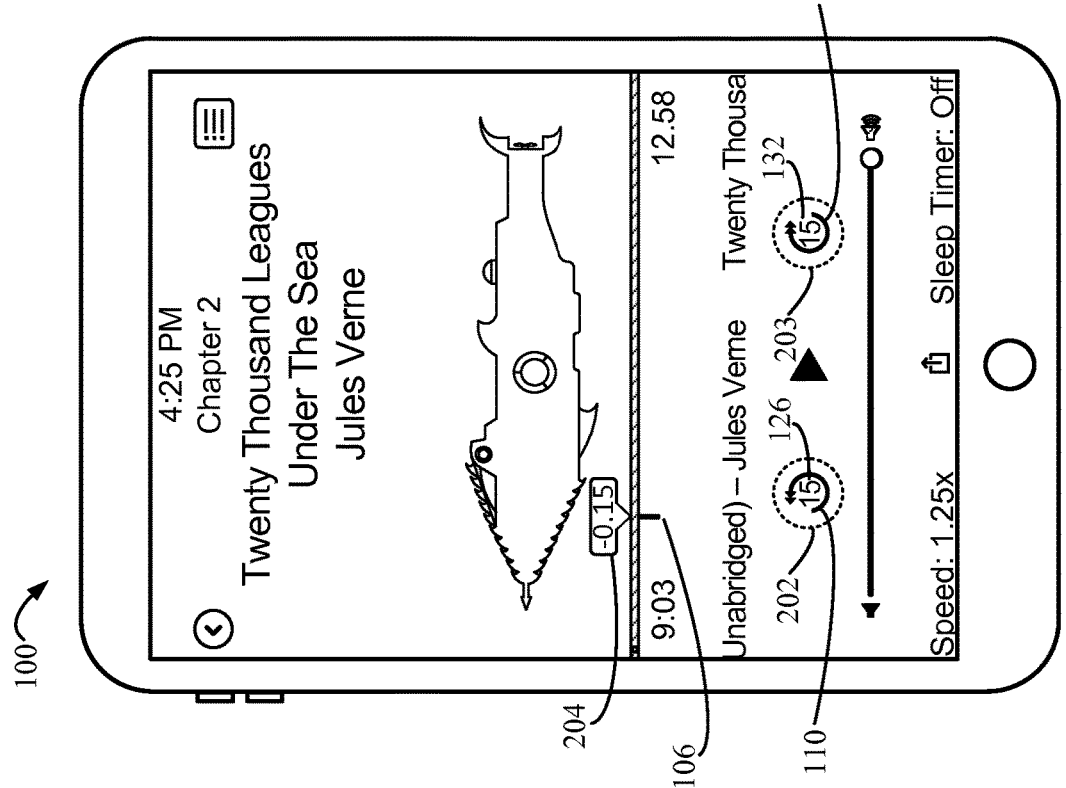
FIG. 2A
FIG. 2B

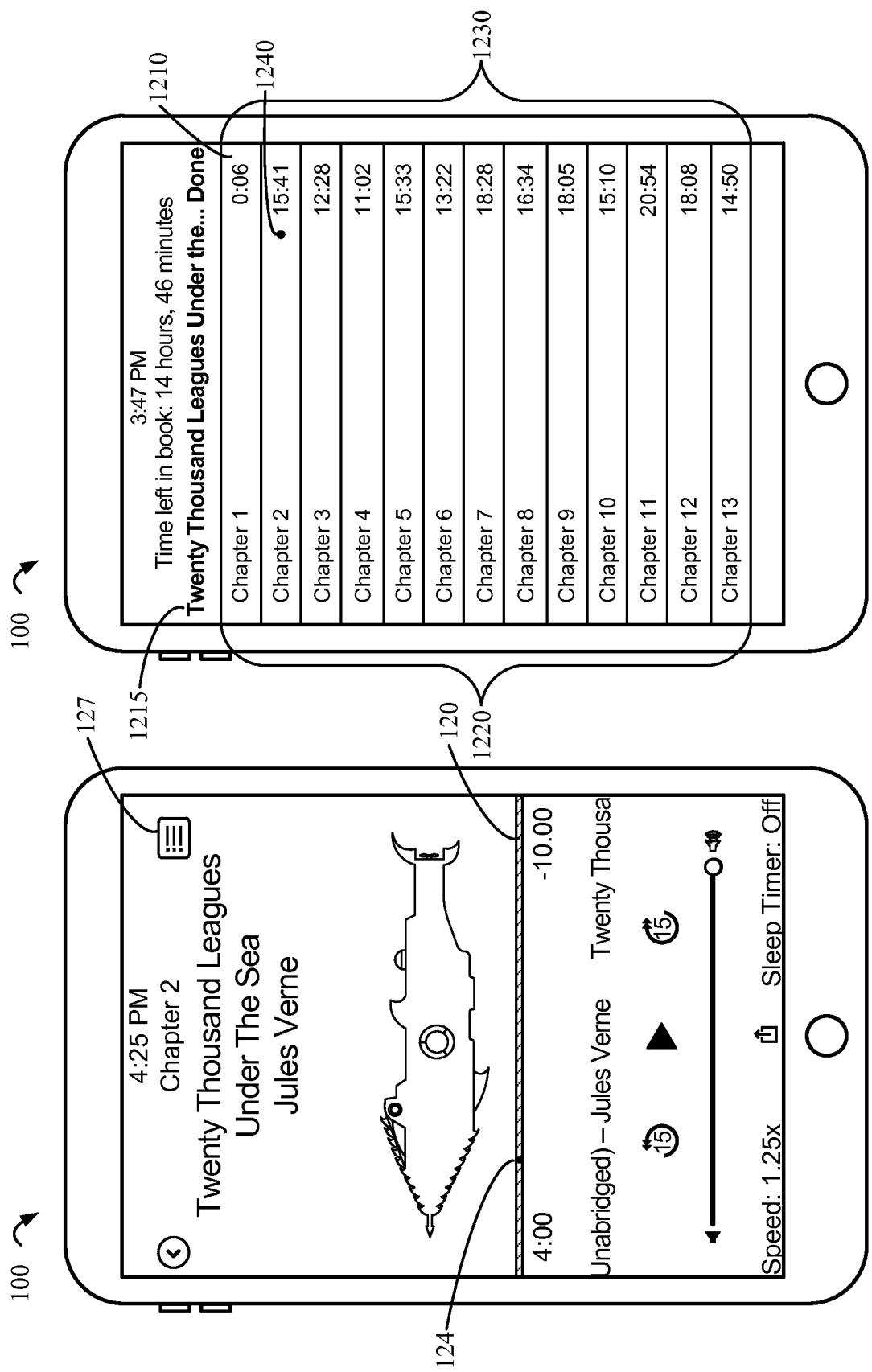

MEDIA PLAYBACK NAVIGATION

CROSS-REFERENCE TO RELATED APPLICATION

The present application claims the benefit of and priority to U.S. Provisional Application No. 62/146,208 entitled "MEDIA PLAYBACK NAVIGATION", filed on Apr. 10, 2015, the entire contents of which is are incorporated herein by reference for all purposes.

BACKGROUND

The present disclosure relates generally to a graphical user interface for navigation within a media file. In particular, the disclosure relates to interface controls for accessing a position within a media file, such as an audiobook, playable by a reader application.

A user listening to an audiobook may wish to navigate to a particular point in the audiobook. For example, a user may be distracted while listening to an audiobook and may wish to review a section of the book that the user missed. Alternatively, a user may want to skip ahead to a later portion of a book.

A user may benefit from controls that are specifically tailored to navigation within a media file that is associated with a document, such as a book. Such controls may be particularly beneficial for navigation within media files containing several hours of content and/or media files associated with text of a book.

BRIEF SUMMARY

The exemplary embodiments provide devices and methods for navigating a media file.

A method in accordance with an exemplary embodiment includes displaying a playback position indicator. User input is received for adjusting a position of the playback position indicator from a first position to a second position. In response to receiving the user input, the electronic device can display a snippet corresponding to content of the media file at the second position of the media file. The snippet can include various types of metadata such as, text from a document, image data, and time information.

A method in accordance with another exemplary embodiment includes displaying a representation of a media file at an area of a display. A user input gesture is received at a location of the display within the area of the display where the representation of the media file is displayed. In response to receiving the user input gesture, a position of a playback position indicator is adjusted from a first position of the media file to second position of the media file.

Other exemplary embodiments are directed to electronic devices, and computer readable media associated with methods described herein.

A better understanding of the nature and advantages of the exemplary embodiments may be gained with reference to the following detailed description and the accompanying drawings.

BRIEF DESCRIPTION OF THE DRAWINGS

The disclosure will be readily understood by the following detailed description in conjunction with the accompanying drawings, wherein like reference numerals designate like elements, and in which:

FIGS. 2A and 2B illustrate a graphical user interface for time skipping, according to an exemplary embodiment.

FIGS. 12A and 12B illustrate a bookmark in a media file, according to an exemplary embodiment.

DETAILED DESCRIPTION

In accordance with various exemplary embodiments, a graphical user interface is described for navigation of a media file.

An "electronic device" as described herein may be any computing device capable of displaying an image, such as a portable electronic device (e.g., mobile phone, media player, tablet, wearable device, laptop, personal digital assistant, gaming device, etc.), desktop electronic device, or other computing device. The electronic device may include a touch-sensitive surface, such as a touchscreen and/or touchpad. The electronic device may display an image using an integrated display component, e.g., by rendering the image on the display. In some exemplary embodiments, an electronic device may display an image by transmitting the image to a remote device (e.g., a monitor, navigation unit, or other remote device communicatively connected to the electronic device). The electronic device may be capable of executing one or more applications. Applications executed by a device may include, for example, a document reader, an Internet browser, a word processing application, or other application capable of displaying a document.

A "media file" as described herein may be an audio file, video file, output of a text-to-speech application, or other file playable by an electronic device. In some exemplary embodiments, a media file is an audiobook file, such as a file including a recording of document text spoken aloud. An audiobook file may include metadata such as an image depicting the book cover, a book name, an author name, images on pages of the book, etc. A document corresponding to a media file, such as a book including text that is spoken aloud in an audiobook media file, may be stored by an electronic device is association with the media file. A media file may be used to describe a complete audiobook or a section of an audiobook, such as a chapter of an audiobook.

A "gesture" as described herein may include an input that corresponds to a pattern stored by an electronic device. An electronic device may store one or more responses in association with a gesture. In response to receiving a gesture, the electronic device may perform one or more of the responses associated with the gesture. An input may be, for example, a contact received at a touch-sensitive surface such as a touchpad or touchscreen. In some exemplary embodiments, gesture input may be provided with a user's finger, a mouse, or other input device.

Gestures may include, e.g., a linear swipe, a pan, a flick, a tap, a double tap, a tap and hold, a pinch and a stretch, and a swipe and hold. A linear swipe can include swiping from a first point to a second point on a display, such as a swipe of a finger along a touch-sensitive surface from a starting contact area to an ending contact area. A swipe and hold can include swiping from a first point to a second point and maintaining contact with the display at the second point.

Figure 1:
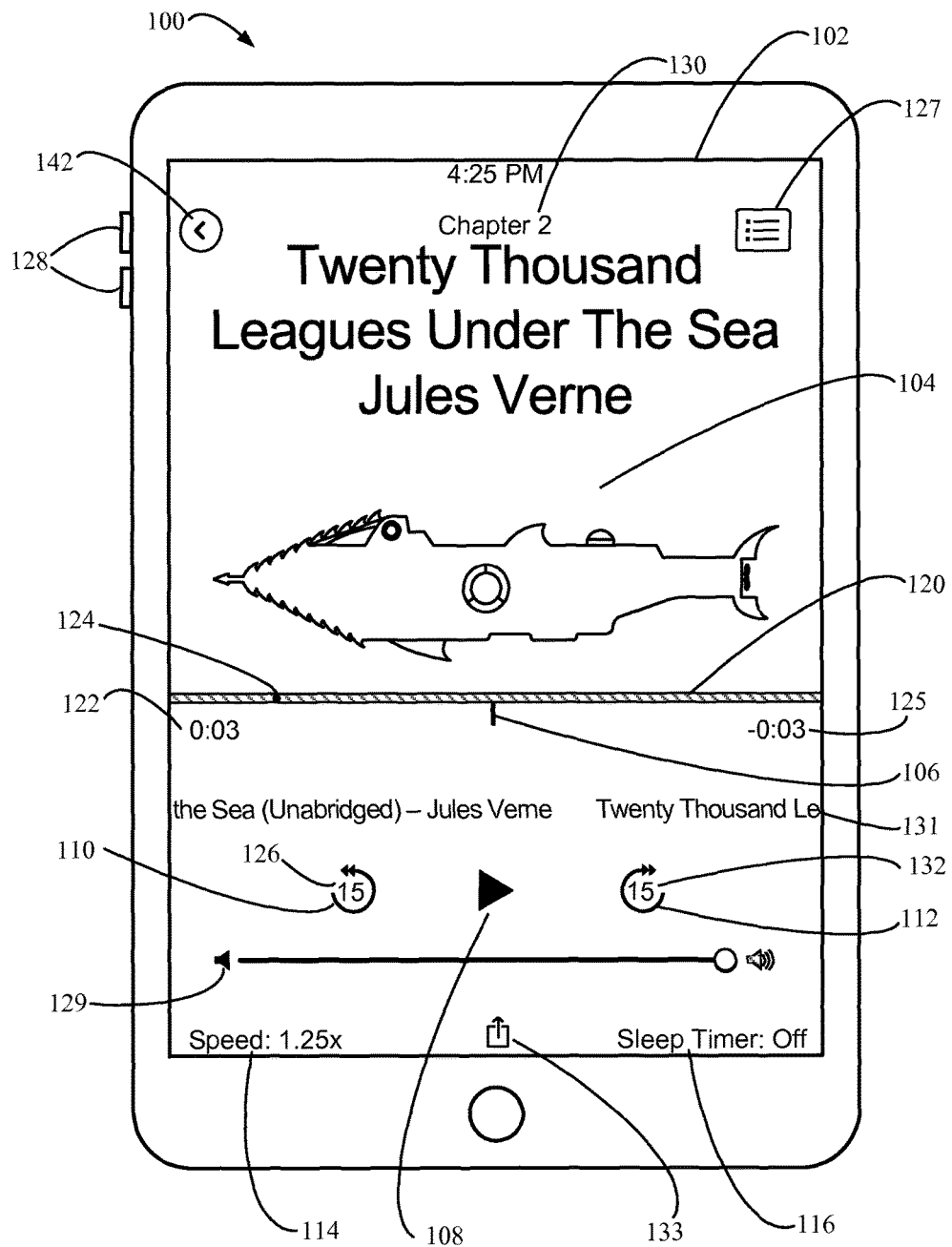
FIG. 1 shows an illustrative electronic device displaying a graphical user interface for media playback control, according to an exemplary embodiment.

FIG. 1 shows an illustrative electronic device displaying a graphical user interface for media playback control, according to an exemplary embodiment. Electronic device 100 includes display 102. The media file depicted in the illustrative example of FIG. 1 is an audiobook indicated by audiobook image 104 displayed by display 102. The audiobook image 104 can be a cover for the audiobook. The cover of the audiobook can be a predetermined cover selected by an author of the audiobook.

The audiobook image 104 can also be an image from content in the audiobook and the audiobook image 104 can change according to the content of the audiobook. For example, if a user is in a chapter of an audiobook with a corresponding image, then the corresponding image can be displayed as audiobook image 104. Further, if the audiobook contains various illustrations or drawings, an illustration or drawing corresponding to the text that is being read, can be displayed as audiobook image 104.

The chapter or track of the book can be displayed in chapter information 130. The title of the book can additionally appear on the audiobook image 104. The title of the book can also appear in title bar 131. The title bar 131 can enable a user to easily see the title of the audiobook. The locations of elements of the user interface described above are merely examples, and the location of, for example, the chapter information 130 and the title bar 131 can be modified.

Playback of the audiobook may be controlled using playback controls 106, 108, 110, 112, 114, and 116, displayed by display 102. Playback controls may include, for example, playback position indicator 106, play/pause control 108, reverse skip control 110, forward skip control 112, playback speed control 114, and sleep timer control 116. Controls can be, for example, a glyph. A glyph can be, for example, a graphic symbol, alphabetic or number font, symbol, etc. For example, sleep timer control 116 and playback speed control 114 can be a glyph.

A user may operate playback controls 106, 108, 110, 112, 114, and 116 to access the functions associated with the respective controls. When display 102 is a touchscreen display, a control may be operated when a contact is detected by electronic device 100 at a location where the control is displayed. A mouse or other pointing device may be used to position a cursor over a location where a control is displayed and a selection input may be provided via the pointing device to operate the control. It will be recognized that various other approaches to receiving a user input indicating operation of an input control may be used with the exemplary embodiments described herein. For example, a user can operate playback controls 106, 108, 110, 112, 114, and 116 using one or more fingers.

A user may drag playback position indicator 106 along scrubber line 120 to indicate a point within a media file from which playback is to begin. For example, a user may drag the playback position indicator 106 by contacting a touchscreen display 102 at a position where playback position indicator 106 is displayed and dragging the playback position indicator 106 to a desired adjusted position. A user may operate play/pause control 108 to begin playback from the position indicated by position indicator 106 or to pause playback at a desired position indicated by position indicator 106. In some exemplary embodiments, playback may resume automatically when contact with playback position indicator 106 ends (e.g. on liftoff).

Scrubber line 120 may be a visual representation of a duration of a media file, such as an entire audiobook or an audiobook chapter or section. Time information corresponding to the scrubber line 120 can vary according to the particular content of the audiobook or audiobook chapter. For example, if a particular chapter of an audiobook is 15 minutes, the scrubber line 120 can be used to scroll along the 15 minute content. Elapsed time indicator 122 may indicate an elapsed amount of time within the content indicated by scrubber line 120 and remaining time indicator 125 may indicate a remaining amount of time within the content indicated by scrubber line 120.

Reverse skip control 110 may be used to adjust a playback position to a position within a media file or a section of a media file prior to the current playback position. The amount of time by which the playback position is moved backward may be the amount of time indicated by a numeric label 126 of reverse skip control 110. For example, in FIG. 1, numeric label 126 of reverse skip control 110 indicates that operating control 110 will move the playback position to a position 15 seconds prior to the current playback position.

Forward skip control 112 may be used to adjust a playback position to a position within a media file or a section of a media file subsequent to the current playback position. The amount of time by which the playback position is moved forward may be the amount of time indicated by a numeric label 132 of forward skip control 112.

In some exemplary embodiments, the amount of time by which the playback position is moved backward when reverse skip control 110 is operated and/or the amount of time by which the playback position is moved forward when forward skip control 112 is operated may be a user-definable value. For example, a user may set a value for reverse skip control 110 and/or forward skip control 112 using a setting adjustment interface for a media playback application. Therefore, although 15 seconds in shown in FIG. 1, the amount of time can be adjusted by a user to increase or decrease the forward skip and reverse skip speed.

Playback rate control 114 may be used to control the rate at which content of a media file is played. For example, a user may select playback rate control 114 indicating "1.5×" to indicate that the media file should be played 1.5 times faster than the rate at which the media file was recorded. The speed may range from, e.g., 0.5× to 3×. As the rate of playback is increased or decreased, the time value corresponding to the scrubber line 120 will be adjusted. For example, if the playback rate is increased, then the time for the audiobook content corresponding to the scrubber line 120 can decrease. If the playback rate is decreased, then the time for the audiobook content corresponding to the scrubber line 120 can increase.

Sleep time control 116 may be used to set a time subsequent to the current time at which electronic device 100 is to automatically stop playback of a media file. For example, a user may operate sleep time control 116 to open a menu for selecting a time at which playback is to stop, such as "in 5 minutes," "in one hour," etc. In some exemplary embodiments, a user may select a point within the media file at which playback is to automatically stop, such as "when current chapter ends." A time at which playback is to automatically stop may be determined based on the selected point within the media file. A time at which playback is to automatically stop may be displayed to the user.

Bookmark control 124 may indicate a bookmarked position within a media file or a section of a media file (e.g., as indicated by scrubber line 120) to which playback has progressed and/or a position at which playback of a media file last occurred. For example, a bookmark may be set when a book is closed (e.g. returned to a virtual bookshelf of a reader application) and/or when a reader application is exited. A bookmark control 124 can also be placed when the user stops playing the media file for a predetermined period of time. When a user resumes listening to the media file, the media file can resume playback at a location of the bookmark control 124. In some exemplary embodiments, a bookmark may be placed by a user or by electronic device 102. In various exemplary embodiments, a bookmark may be placed when playback is paused for greater than a defined period of time.

A user may operate bookmark control 124 to begin playback from the position indicated by bookmark control 124 (or at a position prior to the position indicated by bookmark control 124, as described above). For example, when a user selects bookmark control 124, position indicator 106 may be relocated to the position along scrubber line 120 at which bookmark control 124 is located. In some exemplary embodiments, when bookmark control 124 is operated, a snippet of text may be displayed at or near a position indicated by bookmark control 124. The bookmark location may be communicated from electronic device 100 to another electronic device communicatively coupled to electronic device 100.

The volume of the media file can be adjusted using volume controller 128 and/or volume controller 129. Volume controller 128 can be a physical button on electronic device 100. Volume controller 129 can appear on the graphical user interface.

A table of contents control 127 can be used to view a table of contents view of the audiobook. A table of contents view can show chapters or tracks, and the time length of each of the chapters or tracks in the media file. The table of contents view can also show the current chapter or track that the user was last listening to.

An exit button 142 can be used to exit or close the current media file. If the exit button 142 is selected, the current media file can be exited and different content can be displayed. For example, if the user exits the media file as disclosed in FIG. 1, a table of contents of the books in the user's library can be displayed. However, this is merely an example and a previous screen can be displayed.

The user can also share the media file they are listening to using, for example, share button 133.

In various situations, a user may desire to skip within a media file to a position prior to a current position or to skip forward within a media file to a position subsequent to a current position. For example, a user may have been distracted during playback of the media file and may have missed content of the media file as a result or the particular portion being played back may have been difficult to understand.

If the distraction was brief, the user may wish to reverse skip to a position within the media file that is relatively close to the current playback position 106. If the distraction was lengthy, the user may wish to skip backward to a position within the media file that is relatively far from current playback position 106. When a user wishes to skip to a position in a media file that is relatively far from a current playback position 106, it may be beneficial to enable a user to skip backward through the media file at a gradually increasing rate. Additionally, when a user skips forward or skips backward through the media file, it may be beneficial to enable a user to easily control playback of the media file.

FIGS. 2A and 2B illustrate a graphical user interface for time skipping, in accordance with an exemplary embodiment. The time skipping can be, for example, cumulative time skipping. Therefore, the amount of time corresponding to the skip can increase A user may operate reverse skip control 110 to adjust a playback position to a position within a media file or a section of a media file prior to the current playback position. For example, reverse skip control 110 may be operated when electronic device 102 detects a contact at or near a position indicated by reverse skip contact area 202. In some exemplary embodiments, multiple types of input may be received at reverse skip contact area 202. For example, a first input type may be a "tap" input. A tap input may occur when contact is detected at reverse skip contact area 202 for a period of time that is less than a threshold period of time, such as 0.2-1.0 seconds, e.g., 0.5 seconds.

A second input type may be a "tap and hold" input. A tap and hold input may occur when contact is detected at reverse skip contact area 202 for a period of time that is greater than the threshold period of time.

When the first type of input is received, the amount of time by which the playback position is moved backward may be the amount of time indicated by the numeric label 126 of reverse skip control 110. When the second type of input is received, the amount of time by which the playback position is moved backward may be an amount of time greater than then amount of time indicated by the numeric label 126 of reverse skip control 110. The amount of time by which the playback position is moved backward may continue to increase as the hold continues. The amount of time by which the playback position is moved backward may be indicated at indicator 204. Indicator 204 can be a cumulative time skip indicator. As the amount of skipped time increases, the amount of time indicated by indicator 204 may change.

For example, a user may tap reverse skip control 110 to move to a position 15 seconds prior to current playback position 106 in accordance with the amount of time indicated by number label 126. In another example, a user may tap and hold reverse skip control 110. As contact with reverse skip contact area 202 continues, until a first threshold period of time is reached (e.g., 0.5 seconds), indicator 204 may indicate the same amount of time indicated by number label 126, e.g., 15 seconds (displayed as −0:15 seconds to indicate that time is being skipped backward, i.e., in a negative direction along the time axis indicated by scrubber line 120). As contact with reverse skip contact area 202 continues, when the first threshold period of time is reached, indicator 204 may indicate an amount of time that is greater than the number indicated by number label 126, e.g., 30 seconds (displayed at 206 of FIG. 2B as −0:30 seconds). As contact with reverse skip contact area 202 continues, when a second threshold period of time is reached (e.g., 0.9 seconds), the amount of time indicated by indicator 204 may again increase (e.g., to −0:45 seconds). The time skip interval indicated by indicator 204 may continue to increase as contact with contact area 202 continues.

It will be understood that where contact is described herein, an alternative user input (e.g., brief and/or sustained selection using a pointing device) may be used. In some exemplary embodiments, repetitive tapping may be used in lieu of the sustained contact described herein. The amount of time indicated in indicator 204 may be an amount of time being skipped by a currently occurring skip, an amount of time skipped relative to the position of playback position indicator 106 when skip input was first received, etc.

In various exemplary embodiments, with the receipt of continuous input, the rate at which skip backs occur may accelerate and/or the interval of time for a skip back may increase. By way of example, as continuous input is received at a skip control, a series of one or more skips may occur at a first rate, a subsequent series of one or more skips may occur at a first accelerated rate, a further series of one or more skips may occur at a second accelerated rate, and so on. For example, a series of three fifteen-second skips may occur, followed by a series of three thirty-second skips, followed by a series of three forty-five second skips, etc. An audio cue, such as a beep, may occur for each skip, for each change in skip rate, etc. The increase in skip rate may occur at varying time intervals such that the rate of beeps increases (or decreases) as the skip rate increases.

In another example, as continuous input is received at a skip control, a series of skips may occur for a first interval of time (e.g., four skips with an interval of ten seconds) with a beep for each skip interval and followed by a series of another series of skips back (e.g., four skips back with an interval of ten seconds) that may occur at a first accelerated rate with beeps occurring for each skip back at the first accelerated rate. Continuing with the example, with continuous input, the skipping back may occur for a second interval of time (e.g., forty seconds) and/or a second accelerated rate, and a beep may occur for each second interval of time (e.g., every forty seconds).

Cumulative time skipping may occur when tap and hold input is received at forward skip control 112. A forward skip contact area 203 can also be provided to adjust a playback position to a position within a media file or a section of a media file after the current playback position. For example, as contact with the forward skip contact area 203 corresponding to forward skip control 112 continues, the time indicated by indicator 204 may increase from 0:15 to 0:30, from 0:30 to 0:45, and so on.

In some exemplary embodiments, an audio cue such as a beep may be emitted each time a skip occurs. Although a beep is described, other audio cues can be used to notify a user that they are skipping forward or backward in the media file. The audio cues may provide an auditory indication of the occurrence of cumulative time skipping. Audio cues may be beneficial for users who are not able to look at a display as skipping occurs, such as drivers.

Intervals between audio cues may change as the skip interval increases. For example, a first threshold input time used for a first cumulative skip interval may be greater than a second threshold input time (measured from the end of the first threshold input time) used for a second cumulative skip interval, resulting in a decreasing interval between audio cues as a sustained input continues. As an example, a first threshold input time may be 0.5 seconds from the initiation of contact with a skip control (e.g., skip control 110, 112). A second threshold input time may be 0.9 seconds from the initiation of contact with a skip control, i.e., 0.4 seconds from the end of the first threshold input time. A third threshold input time may be 1.2 seconds from the initiation of contact with a skip control, i.e., 0.3 seconds from the end of the second threshold input time. Because the time intervals become smaller as the first, second, and third thresholds are reached, beeps that occur when the thresholds are reached will gradually become closer together.

Figure 3:
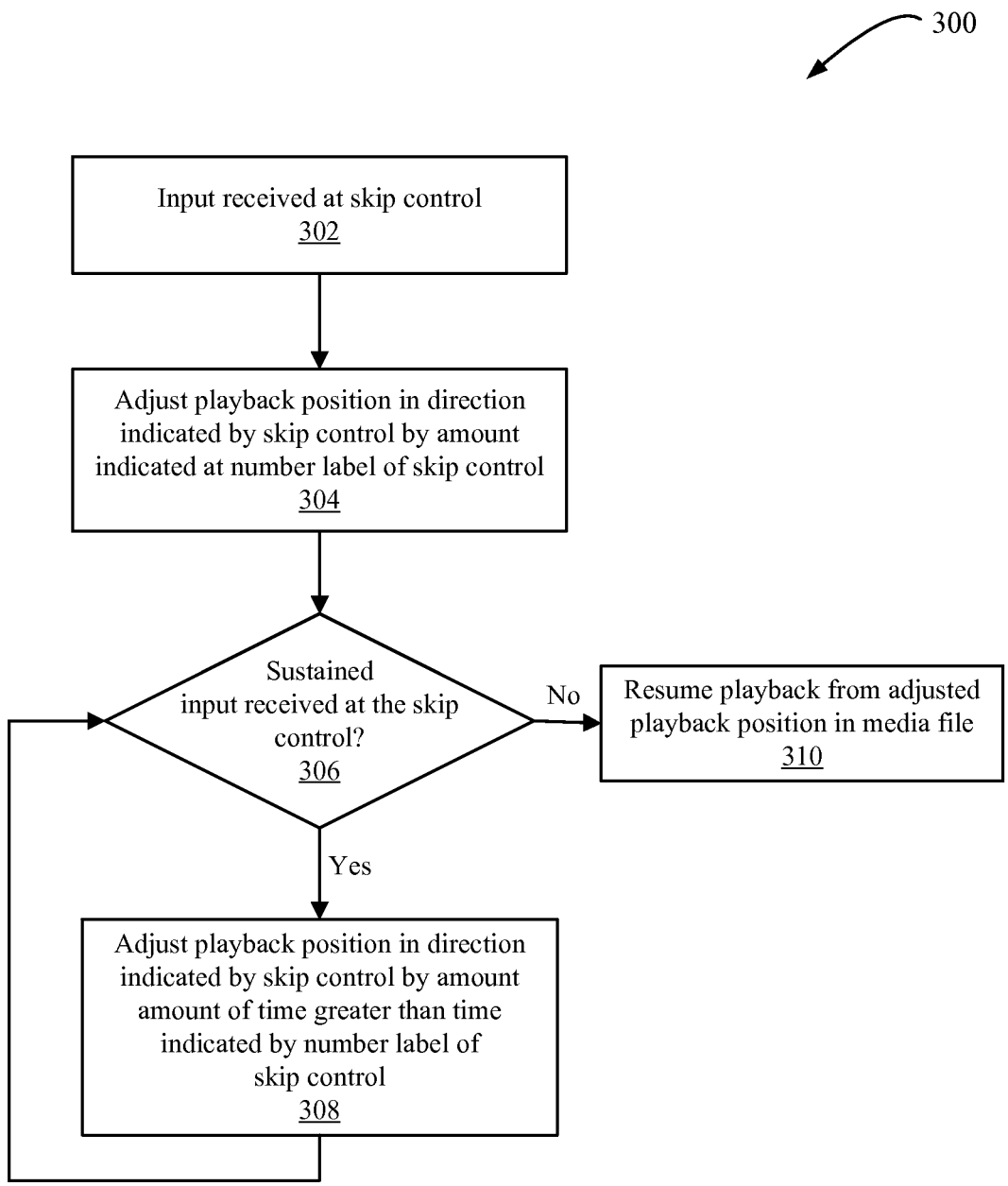
FIG. 3 is a flow diagram indicating exemplary operations of a method for time skipping, according to an exemplary embodiment.

FIG. 3 is a flow diagram indicating exemplary operations of a method 300 for time skipping, according to an exemplary embodiment. The method can be for cumulative time skipping.

At operation 302, electronic device 100 may determine that input was received at a skip control (e.g., reverse skip control 110 or forward skip control 112). For example, electronic device 100 may determine whether a contact was received at reverse skip contact area 202 corresponding to reverse skip control 110 or a skip contact area 203 corresponding to forward skip control 112.

At operation 304, electronic device 100 may adjust a playback position based on the input received at operation 302. For example, if input was received at reverse skip control 110, electronic device 100 may skip backward from a current playback position in a media file to a prior position in the media file. If input was received at forward skip control 112, electronic device 100 may skip forward from a current playback position in a media file to a subsequent position in the media file. The amount of time by which the playback position is adjusted may be the time associated with the control at which the input was received (e.g., for input received at reverse skip control 110, the amount of time may be 15 seconds, as indicated at numeric label 126 and 132.)

At decision diamond 306, electronic device 100 may determine whether the input received at the skip control input of operation 302 is a sustained input. A sustained input may be an input received at the skip control input of operation 302 continuously for greater than a threshold period of time. The threshold period of time may increase each time decision diamond 306 occurs in the flow. The intervals between successive threshold periods of time may change (e.g., may increase or decrease) each time decision diamond 306 occurs in the flow. In some exemplary embodiments, a sustained input may be a series of taps received by electronic device within a time window, such as a window of 2-10 seconds, e.g., a window of 3 seconds.

If the input received at the skip control input of operation 302 is a sustained input, flow may proceed to operation 308.

In some exemplary embodiments, if the input received at the skip control input of operation 302 is a sustained input, an audio cue may be played. In various exemplary embodiments, if the input received at the skip control input of operation 302 is a sustained input, text may be displayed by display 102. Displayed text may be, for example, text of an indicator 204.

At operation 308, electronic device 100 may adjust a playback position based on the sustained input received at the skip control input of operations 302 and 306. For example, if sustained input was received at reverse skip control 110, electronic device 100 may skip backward from a current playback position in a media file to a prior position in the media file. If sustained input was received at forward skip control 112, electronic device 100 may skip forward from a current playback position in a media file to a subsequent position in the media file. The amount of time by which the playback position is adjusted at operation 308 may be an increased period of time that is greater than the time adjustment of operation 304. For example, the increased period of time may be 1.25×-5× the amount of the time adjustment of operation 304, e.g., double the time adjustment of operation 304. The increased period of time may be displayed at indicator 204. The increased period of time may increase each time operation 308 occurs in the flow.

If the input received at the skip control input of operation 302 is not a sustained input, flow may proceed to operation 310.

At operation 310, playback may be resumed from an adjusted playback position in the media file, as adjusted at operation 304 or operation 308. On resumed playback, the media file may be pre-rolled. If the media file is pre-rolled, the media file can be played beginning from a position prior to an indicated playback position. For example, playback may begin from a point in time that is one to ten seconds prior, e.g., five seconds prior, to the position indicated by playback position indicator 106. Therefore, audio can be heard during playback and the media file will resume at, for example, a point where there is audio. In addition, the media file may be pre-rolled to resume at a point at which a word starts and does not start in a middle of a word, thereby giving a user greater context.

In an exemplary embodiment, when the media file resumes playback, the audio may be faded-in. That is, the audio for the media file may gradually increase from a volume below a designated volume up to the designated volume. Therefore, the audio can resume to a designated volume gradually so as not to, for example, startle a user upon resuming the media file.

In another example, electronic device 102 may locate a beginning of a sentence (e.g., when playback position indicator 106 is located at a position that falls within the sentence), a beginning of a chapter (e.g., when playback position indicator 106 is located at a position that falls within the chapter), or other position within the content. Playback may begin at the position within the content located by electronic device 102.

In some exemplary embodiments, user input for navigation within a media file may be provided as gestures. For example, user input gestures may be provided in the region of display 102 where audiobook image 104 is displayed. In addition to or in lieu of using skip controls 110, 112, input for reverse and/or forward skipping may be provided via gestures received at an area of the audiobook image 104 of display 102 at which audiobook image 104 is displayed.

FIGS. 4A, 4B, 4C and 4D illustrate skip control provided via an input gesture, according to an exemplary embodiment. FIGS. 5A, 5B, 5C and 5D illustrate skip control provided via an input gesture, according to another exemplary embodiment.

Figure 4:
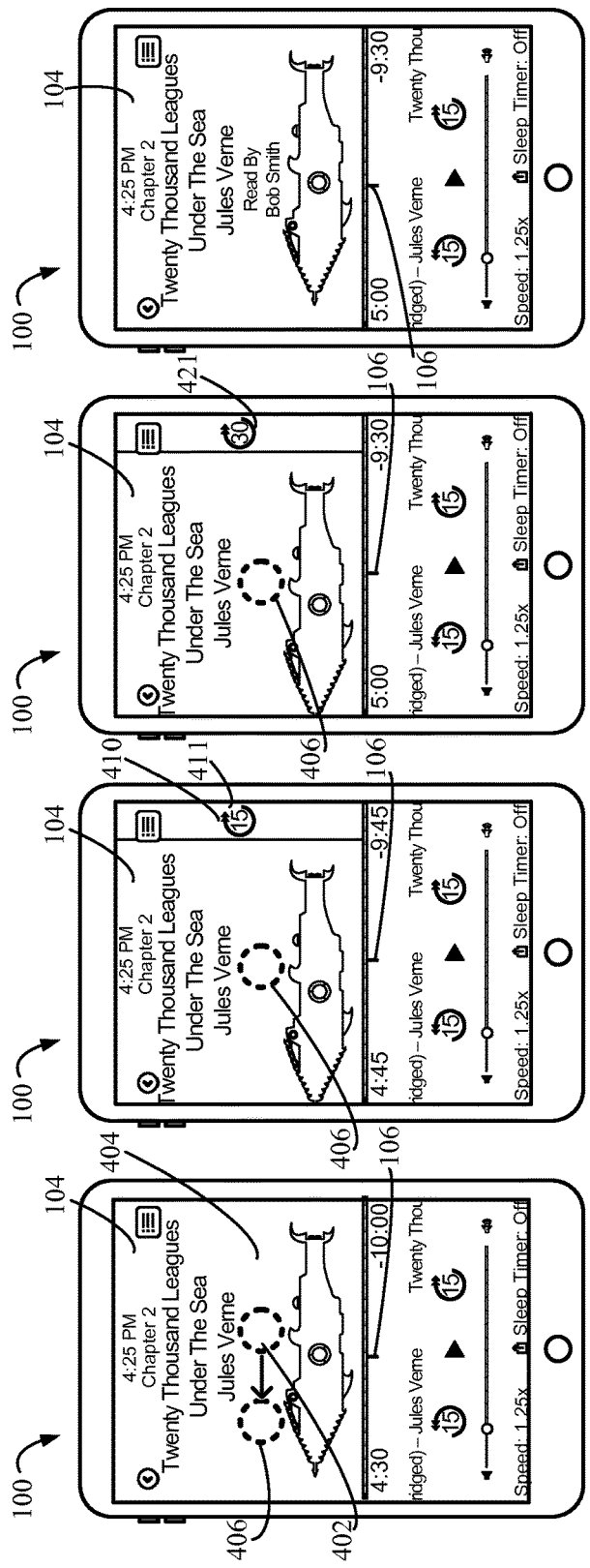
FIGS. 4A, 4B, 4C and 4D illustrate skip control provided via an input gesture, according to an exemplary embodiment.

Electronic device 100 may skip from a current playback point in a media file to another playback point in response to a gesture input received at a touch-sensitive surface of electronic device 100. As shown in FIG. 4A, the gesture input may be an input 402 that occurs when user "swipes" or "flicks" horizontally by dragging a finger along audiobook cover 104, e.g., from first contact area indicated by circle 404 to a second contact area indicated by circle 406. It will be recognized that alternative gestures as described herein may be used as input 402.

In response to gesture input 402, if the user maintains contact or has sustained contact with the second contact area indicated by circle 406, as shown in FIG. 4B, the audiobook image 104 can slide or move towards the left of the display and a forward skip control 410 can be displayed. As shown in FIG. 4B, the initial forward skip control 410 can have a numeric value of 15 seconds. That is, the media file can be skipped forward to 15 seconds subsequent to the current position.

If the user maintains or sustains contact with the second the second contact area indicated by circle 406, then the value of the forward skip control 410 can continue to increase. For example, as shown in FIG. 4C, the forward skip control 410 can increase to 30 seconds since the user has maintained contact with the with the second contact area indicated by circle 406.

The forward skip control 410 can increase in value according to the amount of time that the user maintains contact with the second contact area. For example, as the user maintains contact with the second contact area indicated by circle 406, the forward skip control 410 can increase from a value of 15 seconds, to 30 seconds, to 45 seconds, etc. The speed in which the numeric value increases can also be based on the length of time of contact with the second contact area indicated by circle 406. If the user maintains contact with the second contact area indicated by circle 406 for over a threshold amount of time, the forward skip control 410 can be incremented in larger values. For example, instead of 15 second increments, the numerical value of the skip control 410 can increase by 30 second increments. An audio cue such as a beep may be emitted each time a skip occurs.

In response to received input 402, as shown in FIGS. 4B and 4C, the electronic device may skip from a current playback point in a media file to a subsequent or later point in a media file. The amount of time by which the playback position is moved may be the amount of time indicated by the numeric label 411 or 421 of a skip control such as skip control 410 (e.g., 15 seconds), a user-defined amount of time, or another defined amount of time.

If the user releases contact with the second contact area indicated by circle 406, as shown in FIG. 4D, the audiobook image 104 will resume being displayed without the forward skip control 410.

Although contact areas indicated by circle 406 and 404 are described, contact can be made at other points on the audiobook image 104.

In another example, as shown in FIGS. 5A, 5B, 5C and 5D, in response to an input provided when a user provides an input 502 in which a user swipes from left to right (e.g., from a first contact area indicated by circle 606 to a second contact area indicated by circle 504), electronic device may skip from a current playback point in a media file to a previous or earlier point in a media file. FIGS. 5A, 5B, 5C and 5D can operate similar to FIGS. 4A, 4B, 4C and 4D however, the skip moves to an earlier point in the media file.

Figure 5:
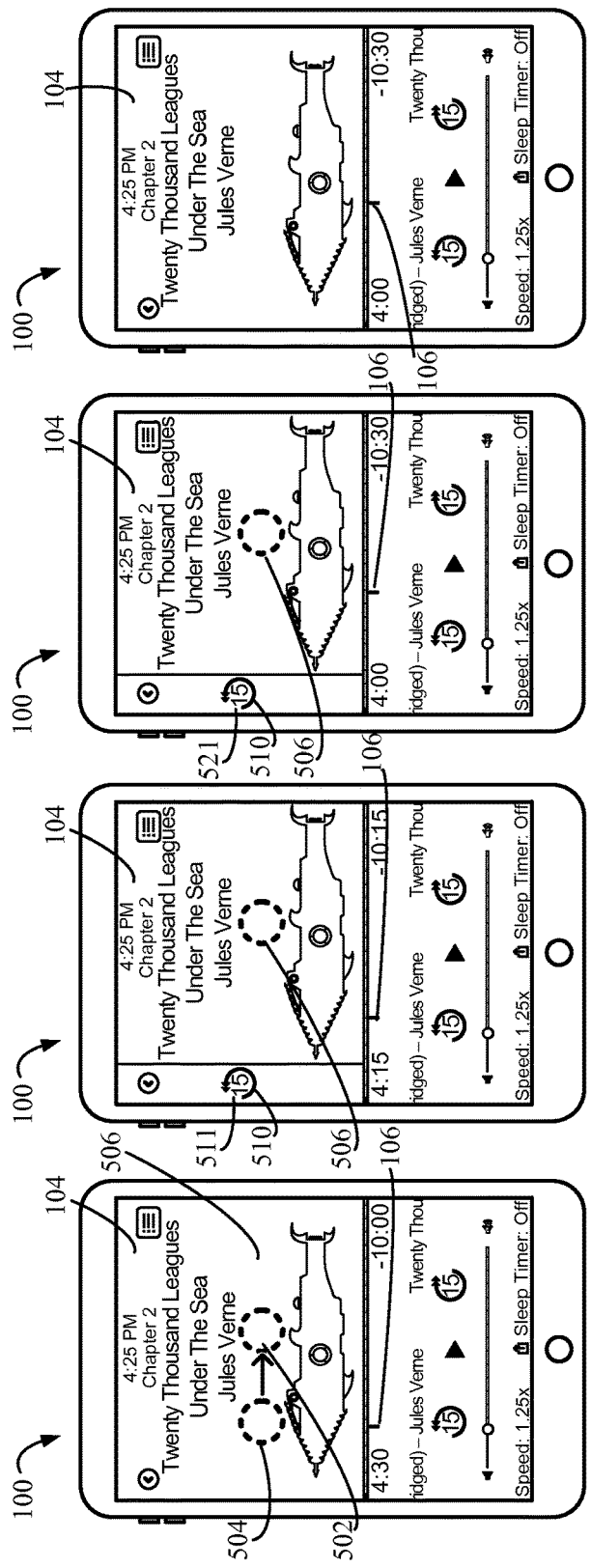
FIGS. 5A, 5B, 5C and 5D illustrate skip control provided via an input gesture, according to another exemplary embodiment.

As shown in FIG. 5A, the gesture input may be an input 502 that occurs when user "swipes" or "flicks" horizontally by dragging a finger along an audiobook image 104, e.g., from first contact area indicated by circle 504 to a second contact area indicated by circle 506. It will be recognized that alternative gestures as described herein may be used as input 502.

In response to gesture input 502, if the user maintains or sustains contact with the second contact area indicated by circle 506, as shown in FIG. 5B, the audiobook image 104 can slide or move towards the right of the display and a reverse skip control 510 can be displayed. As shown in FIG. 5B, the initial reverse skip control 510 can have a numeric value of 15 seconds. That is, the media file can be reversed 15 seconds prior to the current position.

If the user maintains contact with the second the second contact area indicated by circle 506, then the value of the reverse skip control 510 can continue to increase. For example, as shown in FIG. 5C, the reverse skip control 510 can increase to 30 seconds since the user has maintained contact with the audiobook image 104.

The reverse skip control 510 can increase in value according to the amount of time that the user maintains contact with the second contact area. For example, as the user maintains contact with the second contact area indicated by circle 506, the reverse skip control 510 can increase from a value of 15 seconds, to 30 seconds, to 45 seconds, etc. The speed in which the numeric value increases can also be based on the length of time of contact with the second contact area indicated by circle 506. If the user maintains contact with the second contact area indicated by circle 506 for over a threshold amount of time, the reverse skip control 510 can be incremented in larger values. For example, instead of 15 second increments, the numerical value of the skip control 510 can increase by 30 second increments. An audio cue such as a beep may be emitted each time a skip occurs.

In response to received input 502, as shown in FIGS. 5B and 5C, the electronic device may skip from a current playback point in a media file to a previous or earlier point in a media file. The amount of time by which the playback position is moved may be the amount of time indicated by the numeric label 511 or 521 of a skip control such as skip control 510 (e.g., 15 seconds), a user-defined amount of time, or another defined amount of time.

If the user releases contact with the second contact area indicated by circle 506, as shown in FIG. 5D, the audiobook image 104 will resume being displayed without the reverse skip control 510.

Although contact areas indicated by circle 506 and 504 are described, contact can be made at other points on the audiobook image 104. Further, a displayed position of playback position indicator 106 may change in response to an input received as described with regard to FIGS. 4A-4D and 5A-5D.

It will be recognized that, where a horizontal swipe and other particular gestures are described herein, alternative gestures and other inputs may be used for skip control and other controls, including an upward swipe or flick, a downward swipe or flick, or flick, a diagonal swipe or flick, a tapping input, an input provided with two or more fingers (such as a pinching gesture), etc.

FIGS. 6A, 6B, 6C, and 6D illustrate a graphical user interface for chapter skipping, according to an exemplary embodiment.

Figure 6:
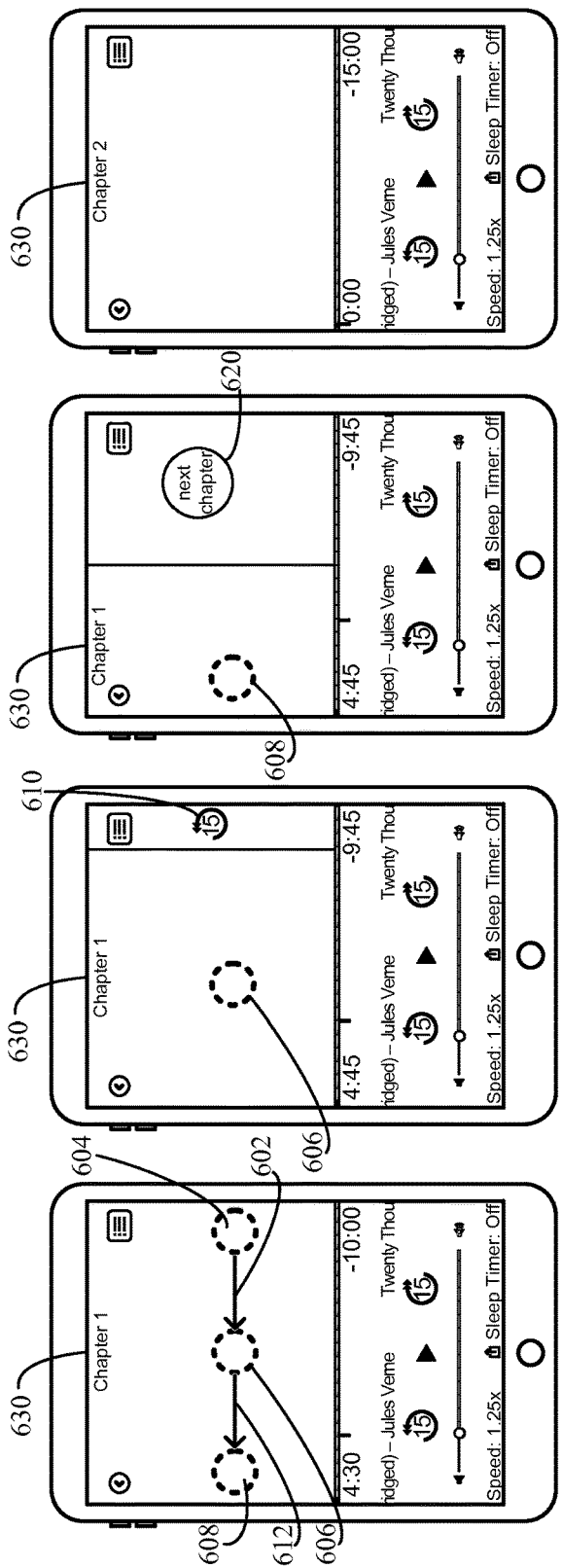
FIGS. 6A, 6B, 6C, and 6D illustrate a graphical user interface for chapter skipping, according to an exemplary embodiment.

Electronic device 100 may skip from a current chapter in a media file to another chapter in response to a gesture input received at a touch-sensitive surface of electronic device 100. As shown in FIG. 6A, the gesture input may be an input that occurs when user "swipes" or "flicks" horizontally by dragging a finger along an audiobook cover 104, e.g., from first contact area indicated by circle 604 to a second contact area indicated by circle 606 to a third contact area indicated by circle 608. Such a horizontal swipe can be identified as an extended horizontal swipe. It will be recognized that alternative gestures as described herein may be used as input.

Similar to that described in FIGS. 4A-4D, in response to gesture input 602, if the user maintains contact with the second contact area indicated by circle 606, as shown in FIG. 6B, the audiobook image 104 can slide or move towards the left of the display and a forward skip control 610 can be displayed. As shown in FIG. 6B, an initial forward skip control 410 can be displayed.

However, in response to input gesture 612, that is, if the user swipes past the second contact area indicated by circle 606 to the third contact area indicated by circle 608, as shown in FIG. 6C, a chapter skip control 620 can be displayed. First contact area, second contact area, and third contact areas are described, however, these are merely examples, and different contact areas on the audiobook display 104 can be used to perform chapter skip control.

If the user releases contact with the third contact area indicated by circle 608, as shown in FIG. 6D, the audiobook image 104 will resume being displayed without the forward skip control 610 or the chapter skip control 620. If the user maintains contact with the third contact area indicated by circle 608, then a chapter skip can be performed. Therefore, if the user is for example, at Chapter 1, but maintains contact with the third contact area indicated by circle 608, then the audiobook can proceed to Chapter 2 and so on according to the length of time that contact is maintained with the third contact area.

Although contact areas indicated by circles 604, 606 and 608 are described, contact can be made at other points on the audiobook image 104 or on other points on the display 102. For example, contact may be made on points where there is no audiobook image. Further, a displayed chapter information 630 can change in response a chapter skipping control input being performed.

It will be recognized that, where a horizontal swipe and other particular gestures are described herein, alternative gestures and other inputs may be used for skip control and other controls, including an upward swipe or flick, a downward swipe or flick, or flick, a diagonal swipe or flick, a tapping input, an input provided with two or more fingers (such as a pinching gesture), etc.

Figure 7:
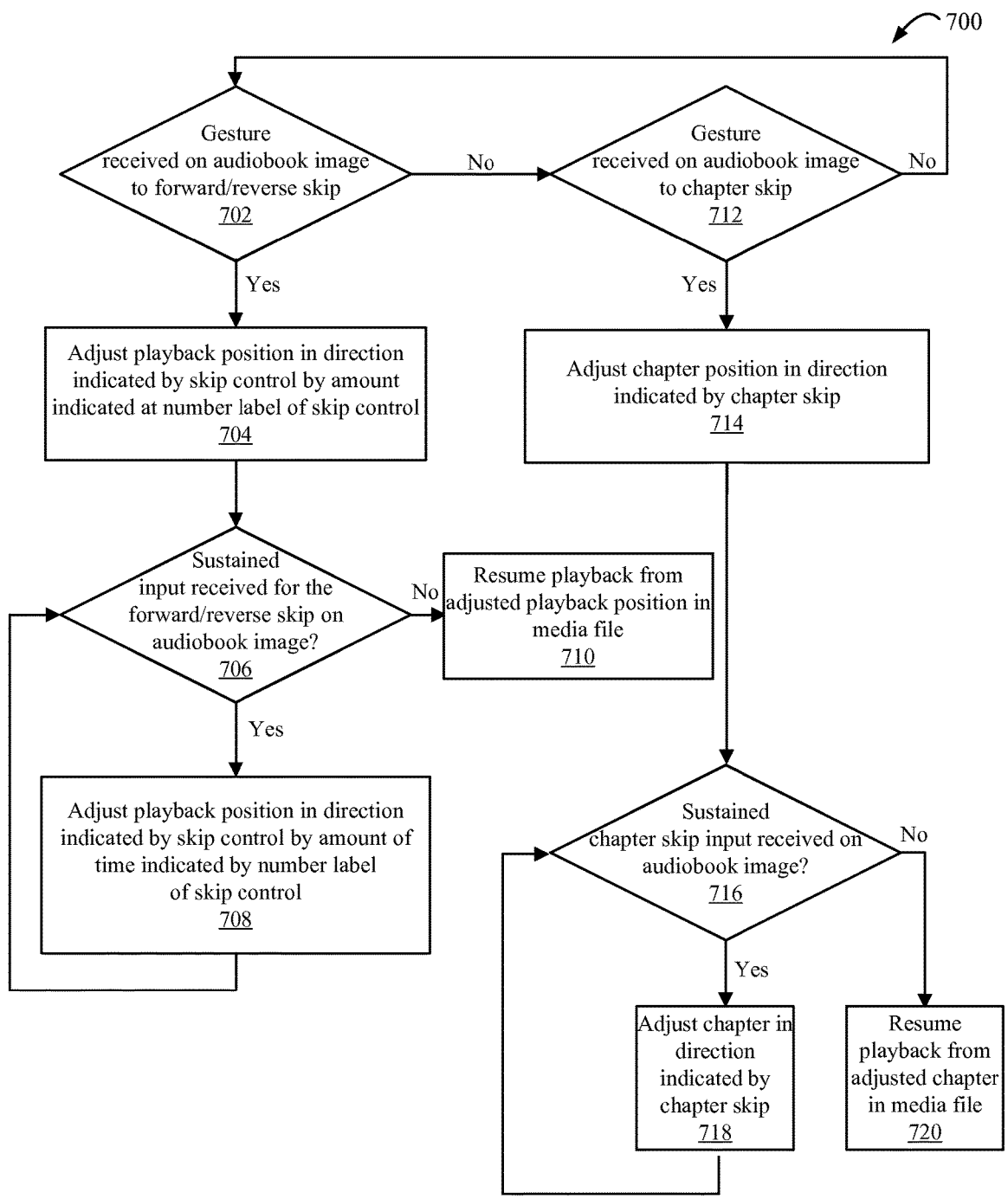
FIG. 7 is a flow diagram indicating exemplary operations of a method for performing time skipping and chapter skipping, according to an exemplary embodiment.

FIG. 7 is a flow diagram indicating exemplary operations of a method 700 for performing time skipping and chapter skipping, according to an exemplary embodiment.

At decision diamond 702, electronic device 100 may determine whether a forward or reverse skip gesture is received on the audiobook image 104, such as a swipe from right to left, as shown in FIGS. 4A-4D, or a swipe from left to right and hold, as shown in FIGS. 5A-5D.

If a forward or reverse skip gesture is received on the audiobook image 104, at operation 704, electronic device 100 may adjust a playback position based on the gesture received at operation 702. For example, if the gesture is a horizontal swipe from right to left from a first contact area indicated by circle 404 to a second contact area indicated by circle 406, as shown in FIG. 4A, electronic device 100 may skip forward from a current playback position in a media file to a subsequent position in the media file. The forward skip control 410 may appear in response to the horizontal swipe from right to left, as shown in FIG. 4B.

If the gesture is a horizontal swipe from left to right from a first contact area indicated by circle 504 to a second contact area indicated by circle 506, as shown in FIG. 5A, electronic device 100 may skip backward from a current playback position in a media file to a prior position in the media file. The reverse skip control 510 may appear in response to the horizontal swipe from left to right, as shown in FIG. 5B.

The amount of time by which the playback position is adjusted may be associated with the value of the skip identified from by the numeric label. For example, as shown in FIG. 4B and FIG. 5B, the skip can be for 15 seconds, as indicated at numeric label 411 and 511, respectively At decision diamond 706, electronic device 100 may determine whether the input received at operation 702 is a sustained forward/reverse skip input. For example, a sustained forward/reverse input may be an input that is received at the second contact area indicated by circle 406 continuously for greater than a threshold period of time. The threshold period of time may increase each time decision diamond 706 occurs in the flow. The intervals between successive threshold periods of time may change (e.g., may increase or decrease) each time decision diamond 706 occurs in the flow. As the user maintains contact with the contact area, an amount of time a user skips forward or reverse will be displayed. Therefore, an amount of time skipped is visible to a user.

Therefore, a user may, for example, swipe from right to left from a first contact area indicated by circle 404 to a second contact area indicated by circle 406, and maintain contact with the second contact area indicated by circle 406, as shown in FIG. 4C.

If the input that was received at operation 702 is a sustained forward/reverse skip input, flow may proceed to operation 708.

In some exemplary embodiments, if the input received at operation 702 is a sustained input, an audio cue may be played. In various exemplary embodiments, if the input received at operation 706 is a sustained forward/reverse skip input, text may be displayed by display 102. Displayed text may be, for example, text of an indicator 204.

At operation 708, electronic device 100 may adjust a playback position based on the sustained forward/reverse skip input received at operations 702 and 706. For example, if sustained contact is received at the second contact area indicated by circle 406, electronic device 100 may skip backward from a current playback position in a media file to a prior position in the media file. If the sustained forward/reverse skip input is received at the second contact area indicate by circle 506, electronic device 100 may skip forward from a current playback position in a media file to a subsequent position in the media file. The amount of time by which the playback position is adjusted at operation 708 may be an increased period of time that is greater than the time adjustment of operation 704. For example, the increased period of time may be 1.25×-5× the amount of the time adjustment of operation 704, e.g., double the time adjustment of operation 704. The increased period of time may increase each time operation 708 occurs in the flow.

If the input received at the skip control input of operation 702 is not a sustained forward/reverse skip input, flow may proceed to operation 710.

At operation 710, playback may be resumed from an adjusted playback position in the media file, as adjusted at operation 704 or operation 708. On resumed playback, the media file may be pre-rolled. If the media file is pre-rolled, the media file can be played beginning from a position prior to an indicated playback position. For example, playback may begin from a point in time that is one to ten seconds prior, e.g., five seconds prior, to the position indicated by playback position indicator 106. Therefore, audio can be heard during playback and the media file will resume at, for example, a point where there is audio and not, for example, blank sound.

In addition, the media file may be pre-rolled to resume at points in which a word starts and not in a middle of a word.

If a forward or reverse skip gesture is not received on the audiobook image 104, at decision diamond 712, electronic device 100 can determine whether a chapter skip gesture is received. For example, as shown in FIGS. 6A-6D, the electronic device 100 can determine whether a user swipes horizontally by dragging a finger along an audiobook cover 104 from first contact area indicated by circle 604 to a second contact area indicated by circle 606 and to a third contact area indicated by circle 608.

If a chapter skip gesture is received on the audiobook image 104, at operation 714, electronic device 100 may adjust a playback position based on the gesture received at operation 712. For example, if the gesture is an extended horizontal swipe from right to left from a first contact area indicated by circle 604 to a second contact area indicated by circle 606 and to a third contact area indicated by circle 608, as shown in FIGS. 6C and 6D, electronic device 100 may skip forward from a current chapter in a media file to a subsequent chapter in the media file. The chapter skip control 620 may appear in response to the horizontal swipe from right to left, as shown in FIG. 6C.

If the gesture is an extended horizontal swipe from left to right, electronic device 100 may skip backward from a current chapter in a media file to a prior chapter in the media file. A reverse chapter control may appear in response to the horizontal swipe from left to right.

At decision diamond 716, electronic device 100 may determine whether the input received at operation 702 is a sustained chapter skip input. For example, a sustained chapter skip input may be an input that is received at the third contact area indicated by circle 608 continuously for greater than a threshold period of time. The threshold period of time may increase each time decision diamond 716 occurs in the flow. The intervals between successive threshold periods of time may change (e.g., may increase or decrease) each time decision diamond 716 occurs in the flow. As the user maintains contact with the contact area, a number of a chapter can be displayed. Therefore, a user can see, for example, a chapter number, as the user skips through chapters.

Therefore, a user may, for example, swipe from right to left from a first contact area indicated by circle 604 to a second contact area indicated by circle 606, then to a third contact are indicated by circle 608 and maintain contact with the third contact area indicated by circle 608, as shown in FIG. 6C.

If the input that was received at operation 702 is a sustained chapter skip input, flow may proceed to operation 718.

In some exemplary embodiments, if the input received at operation 702 is a sustained chapter skip input, an audio cue may be played. In various exemplary embodiments, if the input received at operation 716 is a sustained chapter skip input, text may be displayed by display 102, such as, at chapter information 630.

At operation 718, electronic device 100 may adjust a chapter based on the sustained chapter skip input received at operations 712 and 716. The number of chapters by which the playback position is adjusted at operation 718 may be an increased period of time that is greater than the time adjustment of operation 714. For example, chapters can be skipped in increments of, for example, two or five chapters.

If the input received at the skip control input of operation 702 is not a sustained chapter skip input, flow may proceed to operation 720.

Figure 8A:
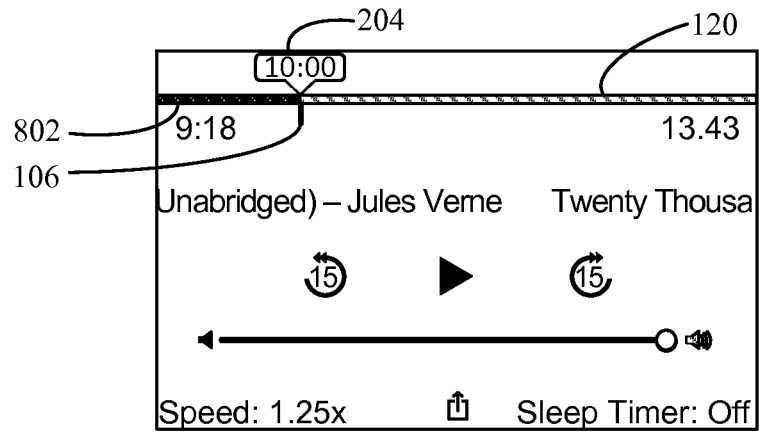
FIGS. 8A, 8B, and 8C illustrate a scrub extent indicator bar, according to an exemplary embodiment.
Figure 8B:
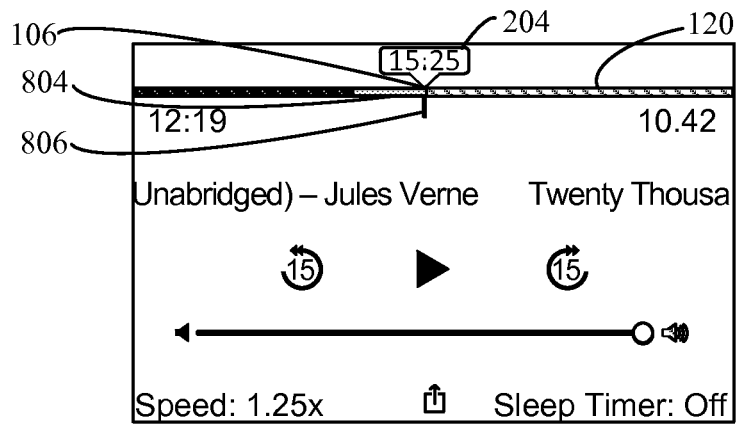
Figure 8C:
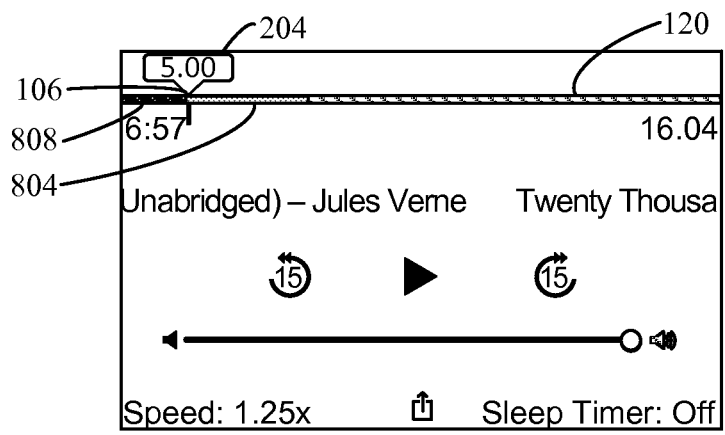

At operation 720, playback may be resumed from a chapter in the media file, as adjusted at operation 714 or operation 718. [0119] FIGS. 8A, 8B, and 8C illustrate a scrub extent indicator bar 804 displayed relative to scrub line 120, according to an exemplary embodiment. Scrub line 120 as indicated in FIGS. 8A-8C may be, e.g., scrub line 120 displayed at display 102 of electronic device 100, as shown at FIG. 1. In FIG. 8A, a darkened section 802 of scrub line 102 indicates the portion of a media file or media file section that has been previously played. Although a darkened section 802 of the scrub line 102 is shown in FIGS. 8A-8C, in an exemplary embodiment, a darkened section 802 may not be displayed.

A user may drag playback position indicator 106 shown in FIG. 8A along scrub line 120 to adjust a position in a media file from which playback will begin.

Scrub indicator bar 804 provides a user with visual feedback indicating the extent to which the playback position indicator 106 has been adjusted relative to an initial position of playback position indicator 106. Scrub indicator bar 804 may be displayed for a duration of time during which playback position indicator 106 is continually adjusted. Additionally or alternatively, scrub indicator bar 804 may be displayed until playback resumes. In another exemplary embodiment, scrub indicator bar 804 may be displayed for a predetermined duration of time.

At FIG. 8B, a user has dragged playback position indicator 106 forward to a point indicated at 806. A scrub extent indicator bar 804 having a greater thickness than scrub line 120 is shown superimposed over scrub line 120 to indicate the extent to which playback position indicator 106 has been moved. As indicated at FIGS. 8B-8C, scrub extent indicator bar 804 may be a "hollow" bar to distinguish the scrub extent indicator bar 804 from darkened section 802 of scrub line 102.

At FIG. 8C, a user has dragged playback position indicator 106 backward to a point indicated at 808. In response to the inputs received at FIGS. 8B-8C, scrub extent indicator bar 804 is shown extending from point 808 to point 806. [0124] Indicator 204 can indicate a point in time of the media file. That is, the time indicator can indicate an absolute time of a current position in the media file. For example, if a user is at minute 10:00 of a media file, then the indicator 204 can indicate an absolute time of 10:00 as shown in FIG. 8A. However, instead of using an absolute time, the indicator 204 can also display a change in value according to a skip. For example, as shown in FIG. 2A, if the user has selected the reverse skip control 110 once, then the indicator 204 can indicate a value of −0:15. If the user again selects the reverse skip control 110, the indicator 204 can indicate a value of −0:30. Therefore, the indicator 204 can display a time change value. Indicator 204 can be used to display information other than or in addition to time. For example, indicator 204 can be used to display snippets from the media file.

Figure 9:
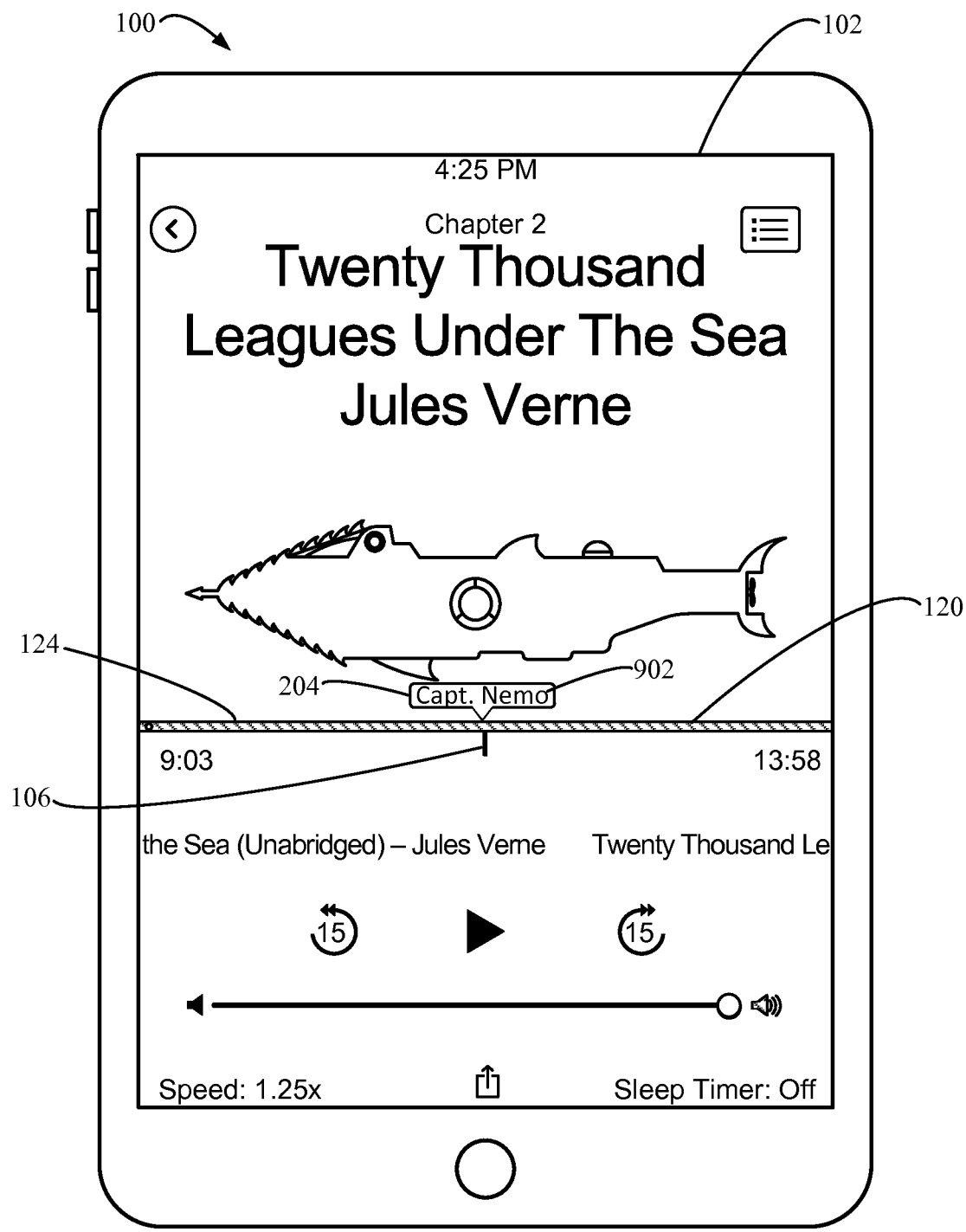
FIG. 9 illustrates a displayed snippet, according to an exemplary embodiment.

FIG. 9 illustrates a displayed snippet, according to an exemplary embodiment. FIG. 9 indicates an exemplary snippet 902, which is a text snippet, displayed in indicator 204. Snippet 902 may be displayed, for example, when position playback indicator 106 is dragged and subsequently released. In some exemplary embodiments, snippet 902 may be displayed subsequent to a skip control received as described above. Displaying a snippet 902 may provide a visual reference that may be useful, for example, to a user trying to locate a previously read location in a book. In some exemplary embodiments, content from a media file corresponding to snippet 902 may be played back as snippet 902 is displayed.

In some exemplary embodiments, each time playback position indicator 106 is released, a snippet of text may be displayed, e.g., at or near a position indicated by playback position indicator 106. A snippet can include metadata from the audiobook. Metadata can include text and images from the audiobook. A snippet of text may be a word, sentence, portion of a sentence, paragraph, portion of a paragraph, column, portion of a column, page, portion of a page, chapter, portion of a chapter, document, portion of a document, book, portion of a book, etc. The snippet of text may include one or more words that correspond to content, such as spoken word content, at or near a location in a media file, such as a location indicated by a playback position indicator. The snippet may include text that that would be played back when playback is initiated from the current playback position of the media file, e.g., as indicated by playback position indicator 106.

The snippet of text may be determined from a document associated with the audio file. For example, the snippet of text may be text from a digital book or digital book chapter corresponding to an audiobook segment indicated by scrubber line 120. The snippet may be obtained from a defined range relative to a playback position. The defined range may be, e.g., a sentence, a paragraph, a chapter, a page, a document, a book, etc. A snippet may be a first word of a sentence, paragraph, chapter, document, book, etc. The snippet of text may be displayed in indicator 204. Alternatively, the snippet of text may be displayed at area of the audiobook image 104 of display 102. In some exemplary embodiments, the media file may continue to play from a point in the media file that corresponds to the end of the snippet.

In some exemplary embodiments, words of a document may be assigned values based on the usefulness of a particular word for navigation purposes (e.g., an article, such as "the," may be a less useful word for helping a user find a location within a document than a noun or a proper noun). A snippet may be selected based on an assigned value. For example, if a selected word for a snippet has a value that falls below a threshold usefulness value, a word having a higher usefulness value may be selected from the words that are nearby the selected word (e.g., next to the selected word, within a defined number of words from the selected word, etc.)

A snippet can also include images. For example, if a current position of the media file has a corresponding image, then the image can be displayed in indicator 204.

In some exemplary embodiments, a notification, such as an e-mail, short message service (SMS) message, application alert, or other communication may be received or occur at electronic device 100 as playback of a media file is ongoing. Playback of the media file may be automatically paused when the notification is received. When the communication of the notification is complete, electronic device 100 may resume playback of the media file. On resumed playback, the media file may be pre-rolled as described above.

Figure 10:
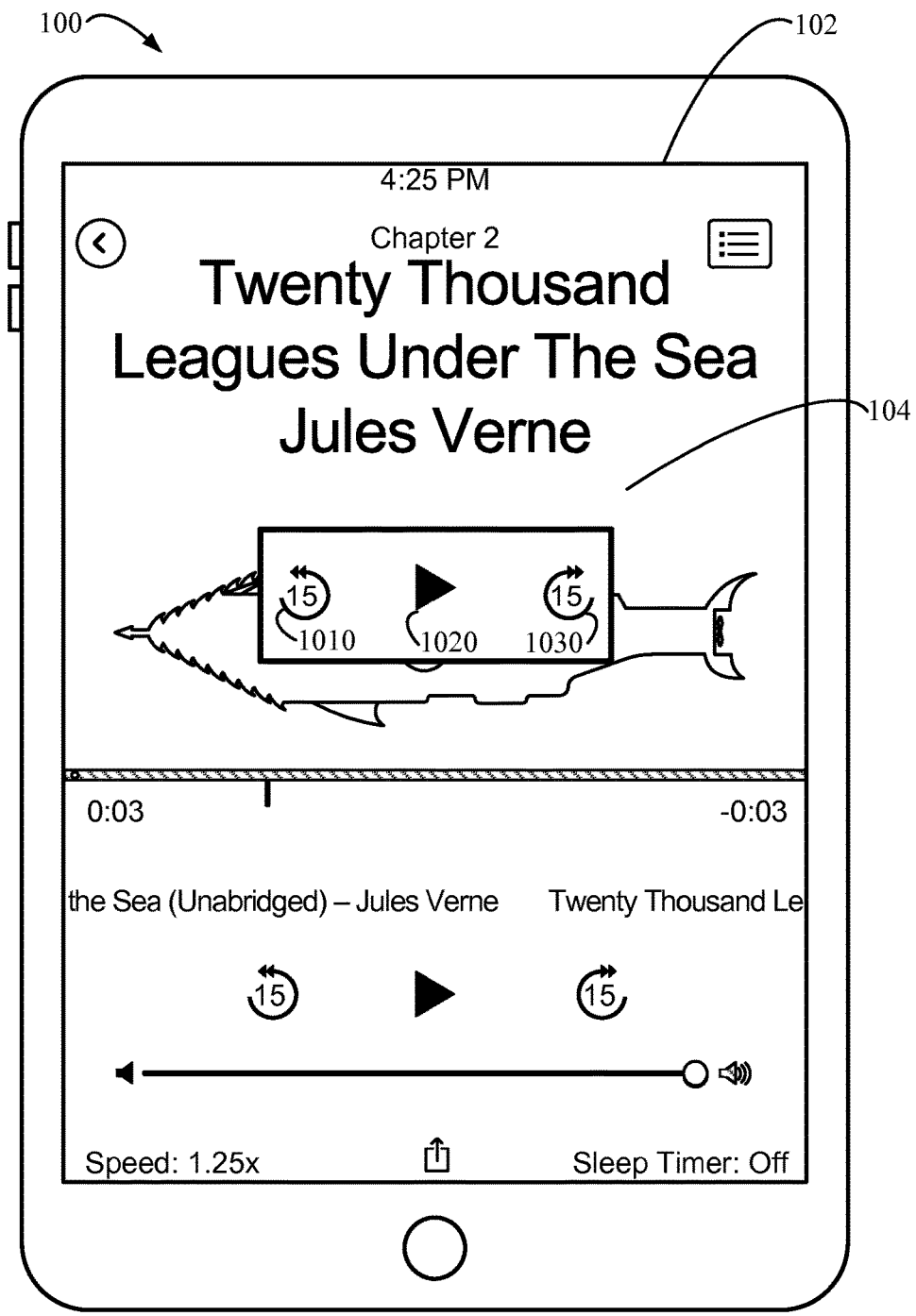
FIG. 10 illustrates an audiobook image for media playback control, according to an exemplary embodiment.

FIG. 10 illustrates an audiobook image for media playback control, according to an exemplary embodiment.

As shown in FIG. 10, the audiobook image 104 can be used to control playback of the audiobook. For example, if the audiobook is currently being played and the user, for example, taps or touches the audiobook image 104, playback controls can be superimposed on the audiobook image 104. The playback controls can be displayed overlaying the audiobook image 104. As shown in FIG. 10, playback controls can include reverse skip control 1010, play/pause control 1020, and forward skip control 1030. If the user selects the play/pause control 1020 that appears on the audiobook image 104, the media file can be paused.

If the media file is currently paused, and the user, for example, taps or touches the audiobook image 104, and then selects the play/pause control 1020 that appears on the audiobook image 104, the media file can resume being played. Although a single tap on the audiobook image 104 is described to produce the playback controls, other gestures can be used.

The playback controls can include play/pause, reverse skip and forward skip as shown in FIG. 10. Additional controls can be used such as, chapter skip forward and chapter skip backward. Therefore, the audiobook image 104, which may be more easily identifiable to a user, can be used to control playback of the media file.

Figure 11:
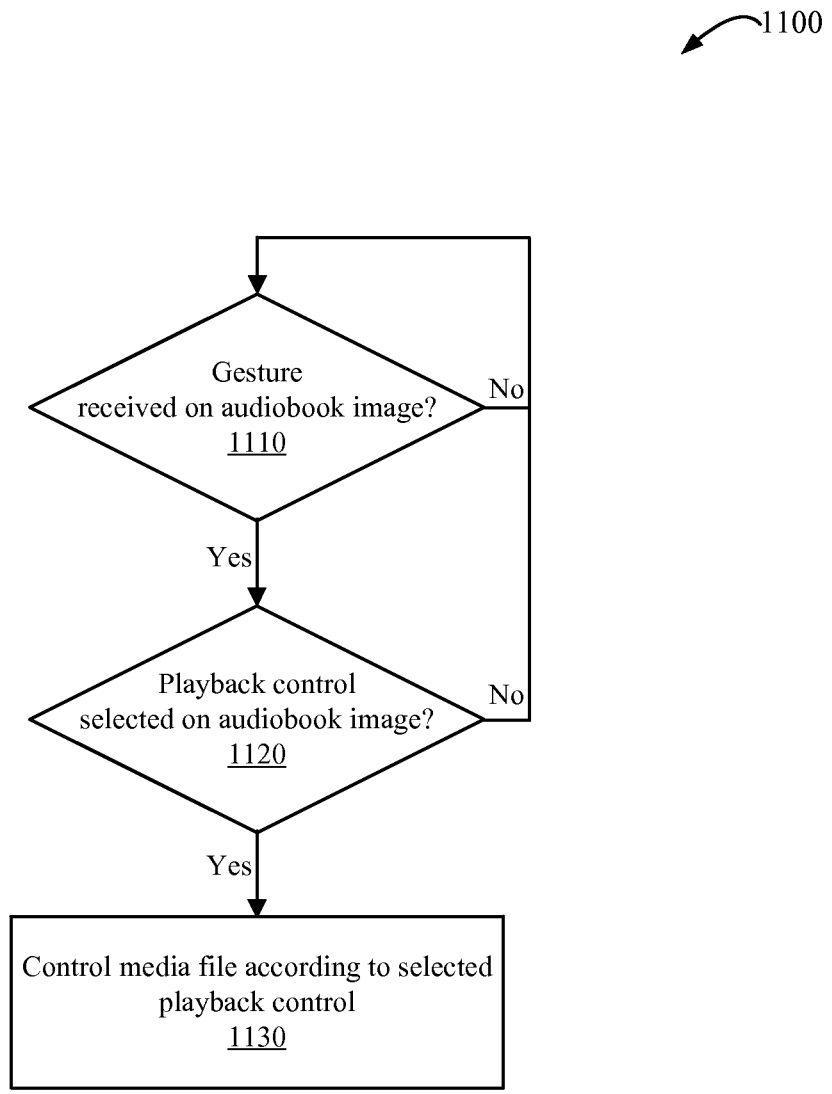
FIG. 11 is a flow diagram indicating exemplary operations of a method for media playback control using the audiobook image, according to an exemplary embodiment.

FIG. 11 is a flow diagram indicating exemplary operations of a method 1100 for media playback control using the audiobook image, according to an exemplary embodiment.

At decision diamond 1110 it is determined whether a gesture has been input on the audiobook image 104. For example, a user may tap once on the audiobook image 104. Although a single tap is disclosed, various gestures can be used to establish playback control on the audiobook image 104. If the user has not input a gesture at operation 1110, then the method can continue to check whether an input has been received on the audiobook cover 104.

If a gesture has been received, at decision diamond 1120, it is determined whether a playback control, which appears on the audiobook image 104, has been selected. For example, it is determined whether a pause/play control 1020, a reverse skip control 1010 or a forward skip control 1030, as shown in FIG. 10, has been selected. If a playback control has not been input, the method can continue to check whether an input has been received on the audiobook cover 104.

If a playback control is input, at operation 1130 the media file will be controlled according to the input playback control. Therefore, a user can control playback of a media file using a playback control on an audiobook image 104, or a user can control playback of a media file using playback controls which appears below the audiobook image 104.

FIGS. 12A and 12B illustrate a bookmark in a media file, according to an exemplary embodiment.

A bookmark control 124 may indicate a bookmarked position within a media file or a section of a media file (e.g., as indicated by scrubber line 120) to which playback has progressed and/or a position at which playback of a media file last occurred. A bookmark may be set when a book is closed (e.g. returned to a virtual bookshelf of a reader application) and/or when a reader application is exited. For example, if a user stops playing a media file at minute 4:00 of the media file, when the user resumes the media file, as shown in FIG. 12A, a bookmark control 124 will appear on scrubber line 120 at minute 4:00. The bookmark control 124 can be created when the user stops playing the media file for a predetermined amount of time, or if the user exits the audiobook application.

Therefore, the user can resume listening to the media file at a point where the user was last listening to the media file or a position at which playback of a media file last occurred. On resumed playback, the media file may be pre-rolled. If the media file is pre-rolled, the media file can be played beginning from a position prior to the bookmark control point. For example, playback may begin from a point in time that is one to ten seconds prior, e.g., five seconds prior, to the position indicated by the bookmark control 124. Therefore, audio can be heard during playback and the media file will resume at, for example, a point where there is audio. In addition, the media file may be pre-rolled to resume at points in which a word starts and not in a middle of a word.

In an exemplary embodiment, when the media file resumes playback, the audio may be faded-in. That is, the audio for the media file may gradually increase from a volume below a designated volume up to the designated volume.

A current bookmark control 124 location can also be identified by viewing a table of contents view 1210, as shown in FIG. 12B. The table of contents view 1210 can be viewed by selecting the table of contents control 127. If the user selects the table of contents control 127, a table of contents of the media file can be displayed, as shown in FIG. 12B. The table of contents view 1210 can include, for example, a title 1215, numbers of chapters in a media file 1220, names of chapters in a media file (not shown), and a time length of each chapter 1230. A bookmark control 1240 can also be shown in the table of contents view 1210. The bookmark control 1240 is located at a point where the user was last listening to the media file or at a position at which playback of a media file last occurred.

Figure 13A:
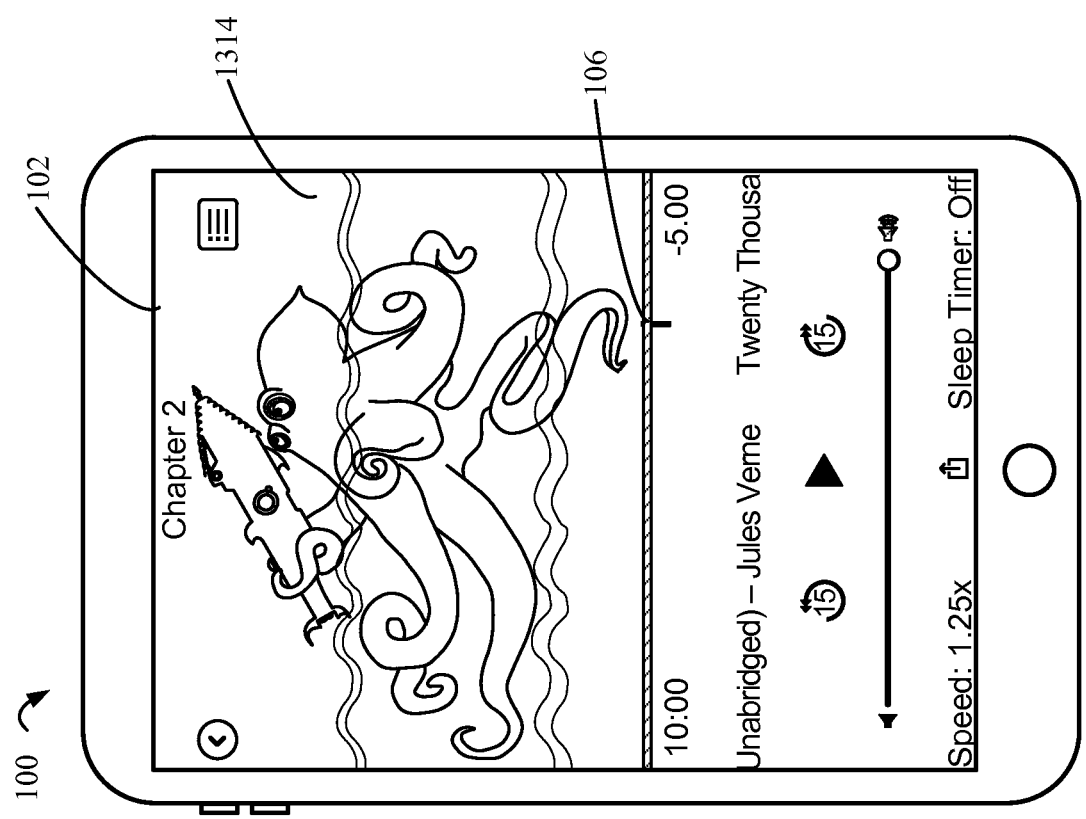
FIGS. 13A and 13B illustrate displaying an audiobook image according to the metadata of a media file, according to an exemplary embodiment.
Figure 13B:
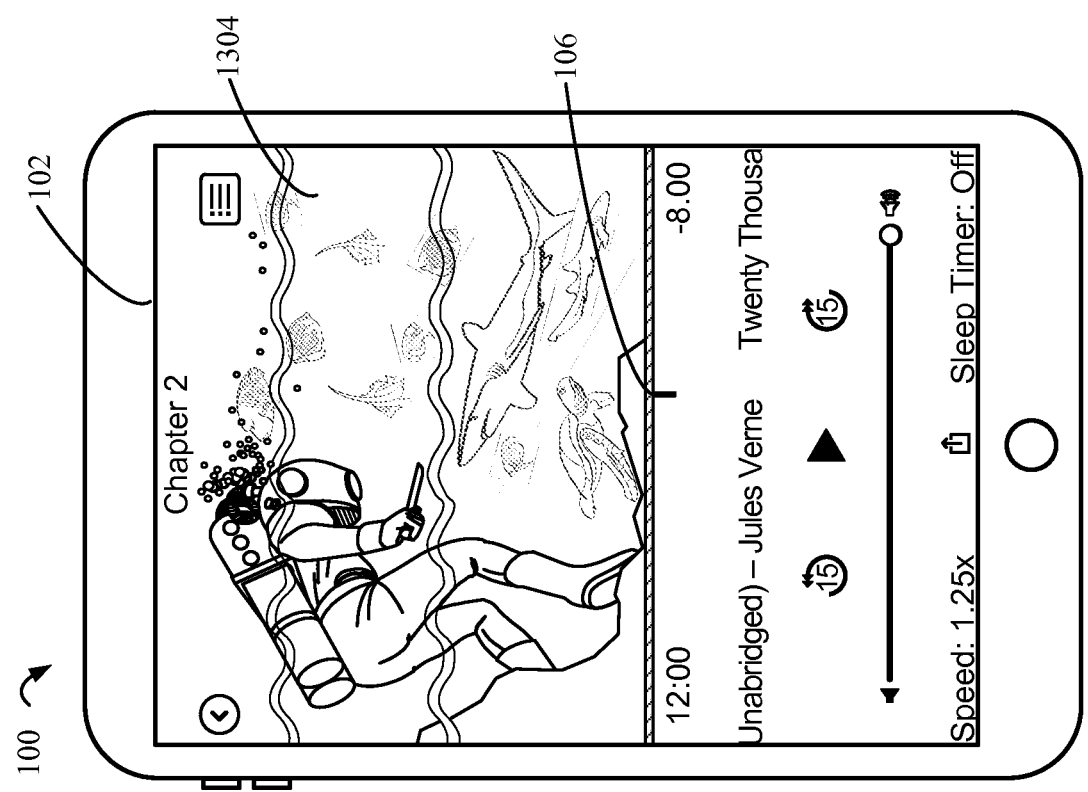

FIGS. 13A and 13B illustrate displaying an audiobook image according to the metadata of a media file, according to an exemplary embodiment.

A media file can include various types of metadata, such as image metadata. In an exemplary embodiment, an audiobook image that is displayed on the display 102 can change according to the portion of the media file being played. For example, if an image corresponds to a particular portion of a media file, a corresponding image is displayed when that portion of the media file is being played.

As shown in FIG. 13A, at minute 12:00 of, for example, chapter 2 of the media file, a corresponding image 1304 can be displayed on display 102. At minute 10:00 of, for example, chapter 2 of the media file, a corresponding audiobook image 1314 can be displayed on the display 102. An audiobook image can change according to, for example, a chapter of the media file or a page in a book corresponding to the content being played by a media file. A user can, for example, see images which correspond to pages of the media file as the user listens to the media file, thereby enhancing the audiobook experience. An audiobook image can remain displayed on the display until a next audiobook image is available for the media file. Further, the playback controls can be displayed superimposed on the audiobook image that is currently displayed on the display 102.

Figure 14:
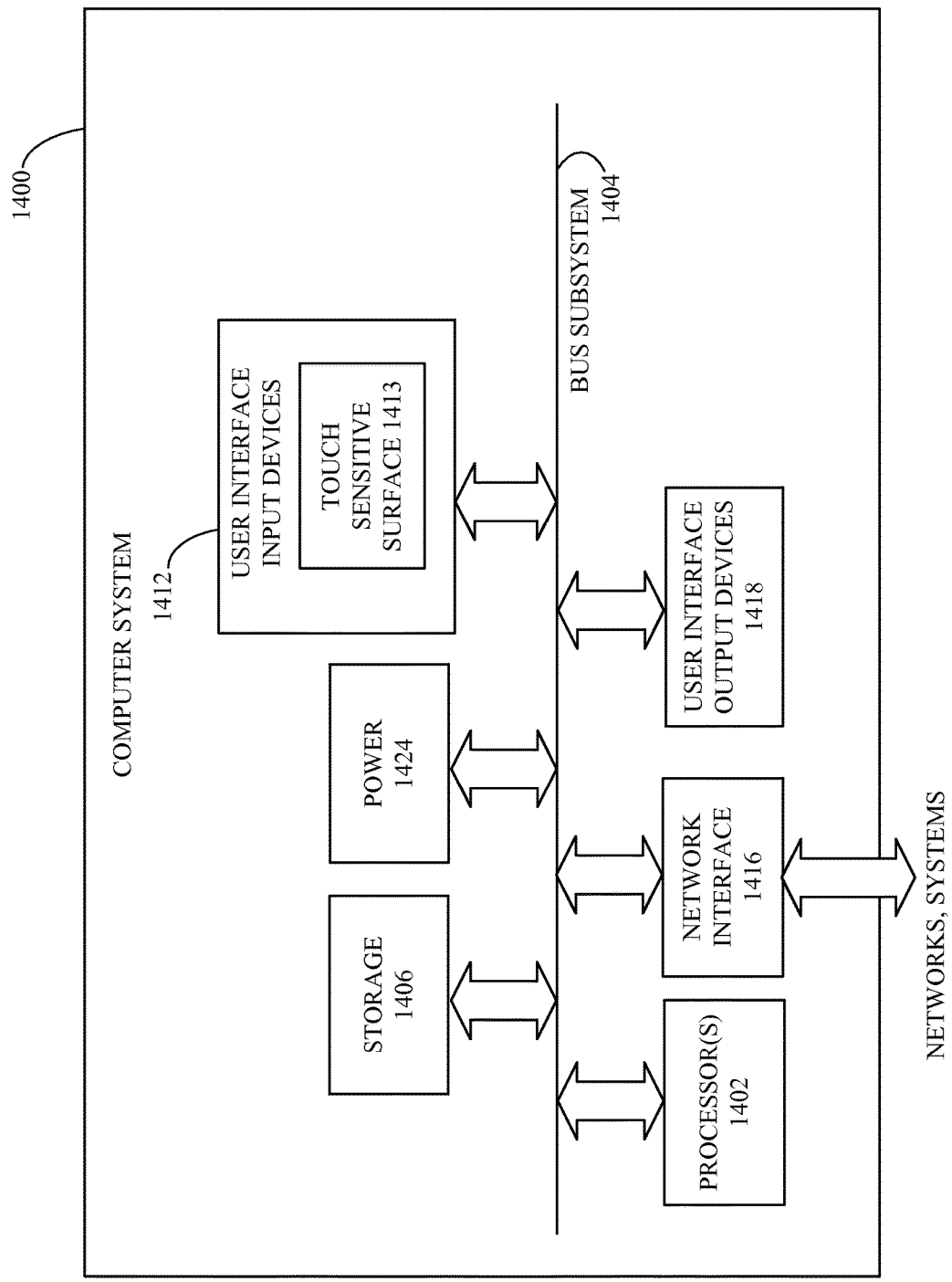
FIG. 14 is a simplified block diagram of a computer system, according to an exemplary embodiment.

Various exemplary embodiments of electronic device 100 may include any of the components described with regard to FIG. 14.

FIG. 14 is a simplified block diagram of a computer system 1400, according to an exemplary embodiment. Electronic device 100 optionally incorporates various elements as described with reference to FIG. 14. As shown in FIG. 14, computer system 1400 includes one or more processors 1402 that communicate with a number of subsystems via a bus subsystem 1404. These subsystems include, for example, a storage subsystem 1406, user interface input devices 1412, user interface output devices 1418, and a network interface subsystem 1416.

Bus subsystem 1404 provides a mechanism for letting the various components and subsystems of computer system 1400 communicate with each other as intended. Although bus subsystem 1404 is shown schematically as a single bus, alternative exemplary embodiments of the bus subsystem optionally utilize multiple busses.

Processor 1402, which can be implemented as one or more integrated circuits (e.g., a conventional microprocessor or microcontroller), controls the operation of computer system 1400. One or more processors 1402 are provided. These processors optionally include single core or multicore processors. In various exemplary embodiments, processor 1402 can execute a variety of programs in response to program code and can maintain multiple concurrently executing programs or processes. At any given time, some or all of the program code to be executed can be resident in processor(s) 1402 and/or in storage subsystem 1406. Through suitable programming, processor(s) 1402 can provide various functionalities described above.

Network interface subsystem 1416 provides an interface to other computer systems and networks. Network interface subsystem 1416 serves as an interface for receiving data from and transmitting data to other systems from computer system 1400. For example, network interface subsystem 1416 enables computer system 1400 to connect to one or more devices via the Internet. In some exemplary embodiments network interface 1416 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), GPS receiver components, and/or other components. In some exemplary embodiments network interface 1416 can provide wired network connectivity (e.g., Ethernet) in addition to or instead of a wireless interface.

User interface input devices 1412 optionally include a touch-sensitive surface 1413. User interface input devices optionally further include, pointing devices such as a mouse or trackball, a touchpad or touch screen incorporated into a display, a scroll wheel, a click wheel, a dial, a button, a switch, a keypad, audio input devices such as voice recognition systems, microphones, and other types of input devices. In general, use of the term "input device" is intended to include all possible types of devices and mechanisms for inputting information to computer system 1400.

User interface output devices 1418 optionally include a display subsystem, indicator lights, or non-visual displays such as audio output devices, etc. The display subsystem includes, for example, one or more of a cathode ray tube (CRT), a flat-panel device such as a liquid crystal display (LCD), a projection device, a touch screen, and the like. In general, use of the term "output device" is intended to include all possible types of devices and mechanisms for outputting information from computer system 1400.

Storage subsystem 1406 provides a computer-readable storage medium for storing the basic programming and data constructs that provide the functionality of some exemplary embodiments. Storage subsystem 1406 can be implemented, e.g., using disk, flash memory, or any other storage media in any combination, and can include volatile and/or non-volatile storage as desired. Software (programs, code modules, instructions) that when executed by a processor provide the functionality described above are stored in storage subsystem 1406. These software modules or instructions are executed by processor(s) 1402. The instructions may optionally be stored on a non-transitory storage device of storage subsystem 1406 either before or after execution by the processor(s) 1402. Storage subsystem 1406 also provides a repository for storing data used in accordance with the exemplary embodiments. Storage subsystem 1406 optionally includes a memory subsystem and a file/disk storage subsystem.

A memory subsystem optionally includes a number of memories including a main random access memory (RAM) for storage of instructions and data during program execution and a read only memory (ROM) in which fixed instructions are stored. A file storage subsystem provides persistent (non-volatile) storage for program and data files, and include, e.g., a hard disk drive, a floppy disk drive along with associated removable media, a Compact Disk Read Only Memory (CD-ROM) drive, an optical drive, removable media cartridges, and other like memory storage media.

The computer device 1400 also includes a power system 1424 for powering the various hardware components. The power system 1424 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

Computer system 1400 can be of various types including a personal computer (e.g., a MacBook®, an iMac®), a portable device (e.g., an iPhone®, an iPad®), a workstation, a network computer, a mainframe, a kiosk, a server or any other data processing system. Due to the ever-changing nature of computers and networks, the description of computer system 1400 depicted in FIG. 14 is intended only as a specific example. Many other configurations having more or fewer components than the system depicted in FIG. 14 are possible.

Various exemplary embodiments described above can be realized using any combination of dedicated components and/or programmable processors and/or other programmable devices. The various exemplary embodiments are implementable only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes optionally use different techniques, or the same pair of processes use different techniques at different times. Further, while the exemplary embodiments described above make reference to specific hardware and software components, those skilled in the art will appreciate that different combinations of hardware and/or software components are also be usable and that particular operations described as being implemented in hardware might also be implemented in software or vice versa.

The various exemplary embodiments are not restricted to operation within certain specific data processing environments, but are free to operate within a plurality of data processing environments. Additionally, although exemplary embodiments have been described using a particular series of transactions, this is not intended to be limiting.

Thus, although specific exemplary embodiments have been described, these are not intended to be limiting. Various modifications and equivalents are within the scope of the following claims.

What is claimed is:

1. A method for navigating an audiobook, comprising:
   at an electronic device with one or more processors, a display, and memory:
   displaying, at an area of the display, an image representing a media file of an audiobook;
   receiving, by the electronic device, a user input gesture at a location of the display within the area of the display where the image representing the media file is displayed, wherein the received user input gesture comprises a swiping motion on the image representing the media file; and
   in response to receiving the user input gesture on the image representing the media file of the audiobook, adjusting a position of a playback position indicator on a playback control element from a first position of the media file to a second position of the media file.

2. The method of claim 1, wherein the image representing the media file is an image associated with the media file.

3. The method of claim 2, wherein the image representing the media file changes according to a content of the media file being played.

4. A method of navigating an audiobook, comprising:
   at an electronic device with one or more processors, a display, and memory:
   displaying, at an area of the display, an image representing a media file of an audiobook;
   receiving, at the area of the display where the image representing the media file is displayed, an input gesture to skip through the media file; and
   in response to receiving the input gesture on the image representing the media file of the audiobook to skip through the media file, adjusting a playback position on a playback control element from a first position of the media file to a second position of the media file.

5. The method of claim 4, wherein the skip comprises one of cumulatively skipping forward and cumulatively skipping backward through the media file.

6. The method of claim 4, wherein the skip comprises one of skipping forward a chapter and skipping backward a chapter through the media file.

7. The method of claim 5, wherein the input gesture to cumulatively skip is received on an audiobook image displayed on the display.

8. The method of claim 5, wherein a time value of the cumulative skip increases in response to the input gesture being maintained over a threshold time.

9. The method of claim 4, further comprising:
   in response to an input to exit the media file, creating a bookmark corresponding to a last played position of the media file.

10. The method of claim 9, further comprising:
    in response to an input to resume playback of the media file, resuming playback of the media file at a position prior to the bookmark.

11. The method of claim 1, wherein the received input gesture is a horizontal swipe.

12. The method according to claim 1, further comprising receiving a sleep time control input designating a time for stopping playback of the audiobook, and
    in response to arriving at the designated time, stopping playback of the audiobook.

13. The method according to claim 9, further comprising in response to an input to resume the media file, resuming playback of the media file a predetermined time before the last played position.

14. The method according to claim 5, wherein the cumulatively skipping forward comprises skipping forward in a predetermined increment of time, and wherein the cumulatively skipping backward comprises skipping backward in predetermined increment of time.

* * * * *